United States Patent
Kim et al.

(10) Patent No.: US 11,709,781 B2
(45) Date of Patent: *Jul. 25, 2023

(54) METHOD OF MANAGING DATA IN STORAGE DEVICE BASED ON VARIABLE SIZE MAPPING, METHOD OF OPERATING STORAGE DEVICE USING THE SAME AND STORAGE DEVICE PERFORMING THE SAME

(71) Applicant: SAMSUNG ELECTRONICS CO., LTD., Suwon-si (KR)

(72) Inventors: Jaeju Kim, Suwon-si (KR); Youngho Park, Anyang-si (KR); Sangyoon Oh, Suwon-si (KR); Hyungchul Jang, Suwon-si (KR); Jekyeom Jeon, Siheung-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,917

(22) Filed: Aug. 15, 2022

(65) Prior Publication Data

US 2022/0391324 A1 Dec. 8, 2022

Related U.S. Application Data

(63) Continuation of application No. 16/989,342, filed on Aug. 10, 2020, now Pat. No. 11,416,412.

(30) Foreign Application Priority Data

Dec. 10, 2019 (KR) .......................... 10-2019-0163385

(51) Int. Cl.
*G06F 12/1009* (2016.01)

(52) U.S. Cl.
CPC .. *G06F 12/1009* (2013.01); *G06F 2212/7201* (2013.01)

(58) Field of Classification Search
CPC ......... G06F 12/1009; G06F 2212/7201; G06F 12/0246
See application file for complete search history.

(56) References Cited

U.S. PATENT DOCUMENTS

| 6,560,051 B1 * | 5/2003 | Nasu .................. G11B 19/02 |
| 7,856,528 B1 | 12/2010 | Frost et al. |
| 8,176,238 B2 | 5/2012 | Yu et al. |
| 8,200,922 B2 | 6/2012 | McKean et al. |

(Continued)

*Primary Examiner* — Chie Yew
(74) *Attorney, Agent, or Firm* — Sughrue Mion, PLLC

(57) ABSTRACT

A method of managing data in a storage device is provided. The storage device includes a plurality of nonvolatile memory chips each including a plurality of pages. A first data object is received from an external host device. The first data object has an unfixed size and corresponds to a first logical address which is a single address. Based on determining that it is impossible to store the first data in a single page among the plurality of pages, a buffering policy for the first data object is set based on at least one selection parameter. While mapping the first logical address of the first data object and a first physical address of pages in which the first data object is stored, a first buffering direction representing the buffering policy for the first data object is stored with a mapping result.

13 Claims, 20 Drawing Sheets

(56) References Cited

U.S. PATENT DOCUMENTS

| | | |
|---|---|---|
| 8,593,866 B2 | 11/2013 | Hutchison et al. |
| 9,164,679 B2 | 10/2015 | Smith |
| 9,798,477 B2 | 10/2017 | Botes et al. |
| 10,082,985 B2 | 9/2018 | Hayes et al. |
| 2007/0079068 A1 | 4/2007 | Draggon |
| 2012/0246383 A1 | 9/2012 | Asano et al. |
| 2019/0286569 A1 | 9/2019 | Xie et al. |

\* cited by examiner

| DATA | LOGICAL ADDRESS | PHYSICAL ADDRESS | | BUFFERING DIRECTION | SIZE |
|---|---|---|---|---|---|
| | | PAGE | STARTING POINT | | |
| D1 | LA1 | PG11 | SP1 | – | SZ1 |
| D2 | LA2 | PG11 | SP2 | – | SZ2 |
| D3 | LA3 | PG11 | SP3 | BD1 or BD2 | SZ3 |
| ⋮ | ⋮ | ⋮ | ⋮ | ⋮ | ⋮ |

METHOD OF MANAGING DATA IN STORAGE DEVICE BASED ON VARIABLE SIZE MAPPING, METHOD OF OPERATING STORAGE DEVICE USING THE SAME AND STORAGE DEVICE PERFORMING THE SAME

CROSS-REFERENCE TO RELATED APPLICATION

This application is a Continuation of U.S. application Ser. No. 16/989,342 filed Aug. 10, 2020, which claims priority under 35 U.S.C. § 119 to Korean Patent Application No. 10-2019-0163385, filed on Dec. 10, 2019 in the Korean Intellectual Property Office, the contents of which are herein incorporated by reference in their entirety.

BACKGROUND

1. Technical Field

Example embodiments relate generally to semiconductor integrated circuits, and more particularly to methods of managing data in storage devices based on variable size mapping, methods of operating storage devices using the methods of managing data, and storage devices performing the methods.

2. Description of Related Art

Certain types of data storage devices include one or more semiconductor memory devices. Examples of such data storage devices include solid state drives (SSDs). These types of data storage devices may have various design and/or performance advantages over hard disk drives (HDDs). Examples of potential advantages include the absence of moving mechanical parts, higher data access speeds, stability, durability, and/or low power consumption. Recently, various systems, e.g., a laptop computer, a car, an airplane, a drone, etc., have adopted the SSDs for data storage.

Typically, the storage device operates based on a fixed size mapping for managing data with a predetermined size. In the fixed size mapping, a size of the physical page is always a multiple of a size of the mapping unit, and one data unit cannot be stored across multiple pages. Recently, a storage device operating based on a variable size mapping in which a size of data is not fixed has been researched.

SUMMARY

At least one example embodiment of the present disclosure provides a method of efficiently managing data in a storage device based on a variable size mapping.

At least one example embodiment of the present disclosure provides a method of efficiently operating a storage device based on the variable size mapping.

At least one example embodiment of the present disclosure provides a storage device performing the methods.

According to an aspect of an example embodiment, there is provided a method of managing data in a storage device including a plurality of nonvolatile memory chips, each nonvolatile memory chip of the plurality of nonvolatile memory chips including a plurality of pages, the method including: receiving a first data object from an external host device, wherein a size of the first data object is not a multiple of a page size, and the first data object is associated with a first logical address which is a single address; determining whether it is possible to store the first data object in a single page among the plurality of pages; based on determining that it is impossible to store the first data object in the single page, setting a buffering policy for the first data object based on at least one selection parameter; mapping the first logical address of the first data object and a first physical address of pages in which the first data object is stored; and storing, in the storage device, a first buffering direction representing the buffering policy for the first data object, and a mapping result.

According to an aspect of another example embodiment, there is provided a method of operating a storage device including a plurality of nonvolatile memory chips each of which includes a plurality of pages, the storage device operating based on a variable size mapping, the method including: performing a data write operation based on a first write command, a first logical address and a first data object received from an external host device, the first data object, wherein a size of the first data object does not correspond to a multiple of a page size, the first data object corresponding to the first logical address, and the first logical address is a single address; and performing a data read operation based on a first read command and the first logical address received from the external host device. The performing the data write operation includes: determining whether it is possible to store the first data object in a single page among the plurality of pages; based on determining that it is impossible to store the first data object in the single page, setting a buffering policy for the first data object based on at least one selection parameter; storing the first data object using two or more pages based on the buffering policy for the first data object; mapping the first logical address of the first data object and a first physical address of the two or more pages in which the first data object is stored; and storing a buffering direction representing the buffering policy for the first data object, and a mapping result.

According to an aspect of another example embodiment, there is provided a storage device including: a plurality of nonvolatile memory chips, each nonvolatile memory chip of the plurality of nonvolatile memory chips including a plurality of pages; a buffer memory configured to temporarily store a first data portion stored the plurality of nonvolatile memory chips or store a second data portion to be stored into the plurality of nonvolatile memory chips; and a storage controller configured to: receive, from an external host device, a first data object, wherein a size of the first data object does not correspond to a multiple of a page size, determine whether it is possible to store the first data object in a single page among the plurality of pages. The storage controller is further configured to, based on determining that it is impossible to store the first data object in the single page: set a buffering policy for the first data object based on at least one selection parameter, map, using a flash translation layer, a first logical address of the first data object and a first physical address of pages in which the first data object is stored, and store a buffering direction representing the buffering policy for the first data object, and based on determining that it is possible to store the first data object in the single page, map, using the flash translation layer, the first logical address and the first physical address of pages into the flash translation layer without setting the buffering policy, wherein the first logical address is a single address, wherein the at least one selection parameter includes at least one of a usage of the buffer memory associated with a data write operation, a reading performance associated with a data read operation, an average size of recently stored data objects among a plurality of data objects stored in the storage device, and a policy setting signal provided from the external host device, wherein the buffering policy is a first buffering policy in which the first data object is stored in different pages included in different nonvolatile memory chips, or a second buffering policy in which the first data object is stored in second pages of a single nonvolatile memory chip, and wherein the first physical address of pages includes a position of a first page which is a foremost page among the pages in which the first data object is stored, and a starting position of the first data object in the first page.

BRIEF DESCRIPTION OF THE DRAWINGS

Illustrative, non-limiting example embodiments will be more clearly understood from the following detailed description taken in conjunction with the accompanying drawings, in which.

DETAILED DESCRIPTION

Figure 1:
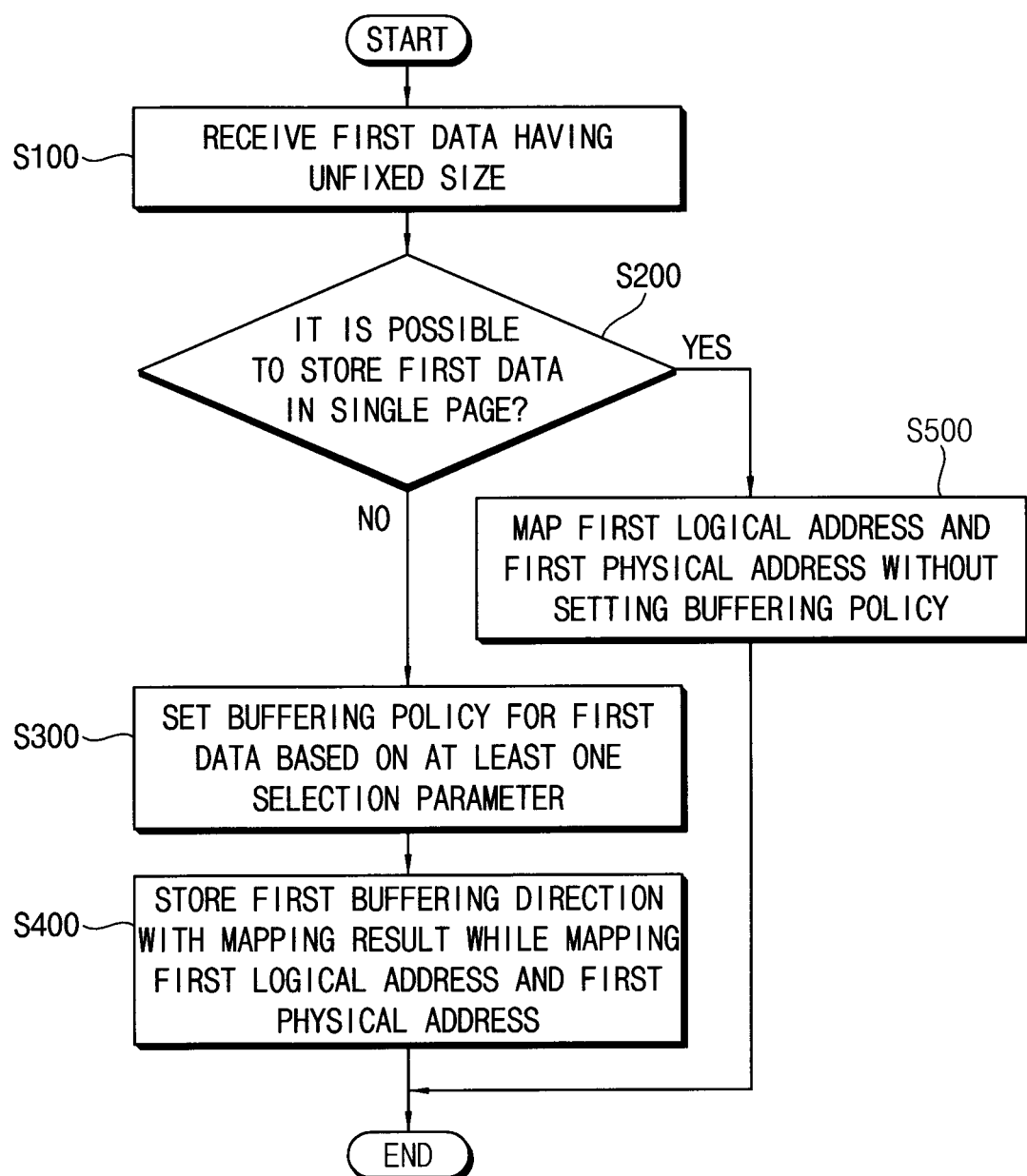
FIG. 1 is a flowchart illustrating a method of managing data in a storage device based on a variable size mapping according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flowchart illustrating a method of managing data in a storage device based on a variable size mapping according to example embodiments.

Referring to FIG. 1, a storage device according to example embodiments includes a plurality of nonvolatile memory chips that store data, and a storage controller that controls an operation of the plurality of nonvolatile memory chips. Each of the plurality of nonvolatile memory chips includes a plurality of pages. In addition, the storage device may further include a buffer memory. Configurations of the storage device and a storage system including the storage device will be described with reference to FIG. 2.

The storage device according to example embodiments operates based on a variable size mapping. Unlike a fixed size mapping in which data received from an external host device is always managed with a fixed size in the storage device, a size of data stored in the storage device and corresponding to one logical address may not be fixed in the variable size mapping. For example, a size of data provided from an external host device may not be fixed and may be variable, and one data unit (e.g., a chunk of logical data) may be stored across multiple or several pages. In the fixed size mapping in which data is always managed with the fixed size, a size of the physical page in the storage device is always a multiple of a size of the mapping unit, and thus one data unit is not stored across multiple pages. In contrast, in the variable size mapping or unstructured data management in which the size of data is not fixed, it may happen that a chunk of logical data needs to be stored across multiple pages.

For example, even in the fixed size mapping in which data is divided and stored in a fixed size address space in the storage device, a size of data input/output (I/O) from a file system of the external host device may be different each or every time (even if it may always be a multiple of a block size of the file system). For another example, even if the external host device always generates data input/output (e.g., data write) with the same size, the storage device may be implemented with the variable size mapping internally when the storage device compresses and stores the data input/output. In other words, whether the storage device operates based on the fixed size mapping or the variable size mapping may be regardless or independent of a data unit provided from the external host device (e.g., from a host perspective), and may be associated with or related to a data unit managed by the storage device (e.g., from a device perspective).

In the method of managing data in the storage device based on the variable size mapping according to example embodiments, first data having an unfixed size is received from the external host device (operation S100). As will be described with reference to FIG. 5A, the first data corresponds to a first logical address which is a single address, and may be provided together with the first logical address.

For example, as will be described with reference to FIG. 14, the first data may be provided for a data write operation. However, example embodiments are not limited thereto, and the first data may be provided for any operation and/or data processing operation of the storage device.

It is determined or checked whether it is possible to store the first data in a single page among the plurality of pages (operation S200). A size of a chunk of logical data provided from the external host device may not be fixed, however, a size of each of the plurality of pages included in the storage device may be physically fixed. Thus, a size of the first data may be compared with a size of the single page, and a scheme of managing the first data may be determined or selected differently according to a result of comparison and determination.

When it is impossible to store the first data in the single page (operation S200: NO), a buffering policy for the first data is set based on at least one selection parameter (operation S300), and a first buffering direction representing the buffering policy for the first data is stored together with a mapping result while mapping the first logical address of the first data and a first physical address of pages in which the first data is stored (operation S400). In some embodiments, the mapping result is an indication of a start address in a particular nonvolatile memory chip.

The buffering policy may represent a scheme of storing the first data in the pages. The buffering policy may be referred to as a buffering order (or a page buffering order), a striping policy (or a data striping policy), a striping order (or a way striping order), and the like. The buffering policy will be described with reference to FIGS. 5B and 5C. In addition, detailed examples of operation S300, e.g., types of the at least one selection parameter and specific schemes of setting the buffering policy will be described with reference to FIGS. 6 through 12.

In some example embodiments, an operation of setting the buffering policy for the first data may be adaptively performed during runtime (e.g., in real time) operating the storage device. In other words, which policy to apply to each page may be intelligently and variably set and changed during runtime by a firmware before programming data.

When it is possible to store the first data in the single page (operation S200: YES), the first data may not be stored across multiple pages, and thus the first logical address and the first physical address may be mapped without setting the buffering policy for the first data (operation S500).

In the method of managing data in the storage device based on the variable size mapping according to example embodiments, the buffering policy for data stored across multiple pages (e.g., the policy for each page) may be adaptively and/or intelligently set during runtime and may be changed according to the operating environment of the storage device. Accordingly, the balance between performance and available resources of the storage device may be controlled or adjusted, and the performance and efficiency of the storage device may be improved or enhanced.

Figure 2:
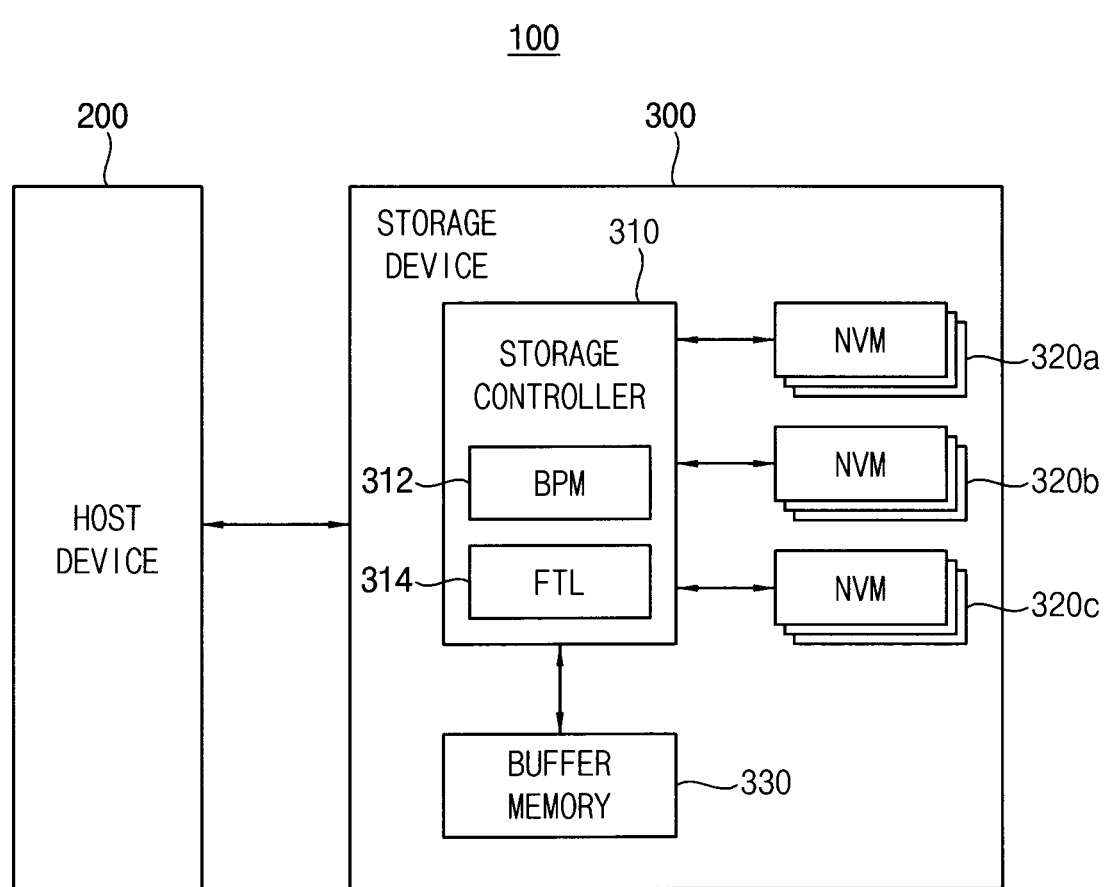
FIG. 2 is a block diagram illustrating a storage device and a storage system including the storage device according to example embodiments.

FIG. 2 is a block diagram illustrating a storage device and a storage system including the storage device according to example embodiments.

Referring to FIG. 2, a storage system 100 includes a host device 200 and a storage device 300.

The host device 200 controls overall operations of the storage system 100. The host device 200 may include a host processor and a host memory. The host processor may control an operation of the host device 200. For example, the host processor may execute an operating system (OS). The host memory may store instructions and/or data that are executed and/or processed by the host processor. For example, the operating system executed by the host processor may include a file system for file management and a device driver for controlling peripheral devices including the storage device 300 at the operating system level.

The storage device 300 is accessed by the host device 200. The storage device 300 may include a storage controller 310, a plurality of nonvolatile memories 320a, 320b and 320c, and a buffer memory 330.

The storage controller 310 may control an operation of the storage device 300 and/or operations of the plurality of nonvolatile memories 320a, 320b and 320c based on a command, an address and data that are received from the host device 200. The storage controller may be implemented by one or more processors or by custom hardware such as an application-specific integrated circuit (ASIC).

The storage controller 310 may perform the method described with reference to FIG. 1. For example, the storage controller 310 may receive one data (e.g., a chunk of logical data) having an unfixed size from the host device 200, may determine whether it is possible to store the received data in a single page, and may set a buffering policy to store information associated with the buffering policy together while performing an address mapping or may perform the address mapping without setting the buffering policy, according to the determination result. In other words, the storage controller 310 may set an optimal or optimized buffering policy for each page in consideration of various conditions. In addition, the storage controller 310 may perform methods which will be described with reference to FIGS. 14, 17 and 19.

The storage controller 310 may include a buffering policy manager (BPM) 312 and a flash translation layer (FTL) 314. The buffering policy manager 312 may set and/or determine the above-described buffering policy. The flash translation layer 314 may translate a logical address provided from the host device 200 into a physical address of the nonvolatile memories 320a, 320b and 320c, and may manage data stored in the nonvolatile memories 320a, 320b and 320c. The flash translation layer 314 may be stored in the nonvolatile memories 320a, 320b and 320c, and the buffer memory 330 may load and store the flash translation layer 314 while operating or driving the storage device 300.

The plurality of nonvolatile memories 320a, 320b and 320c may store a plurality of data. For example, the plurality of nonvolatile memories 320a, 320b and 320c may store meta data, various user data, or the like.

Each nonvolatile memory may be disposed on a respective one semiconductor die, and may form a respective one nonvolatile memory chip. In this specification, a nonvolatile memory, a nonvolatile memory chip and a nonvolatile memory die may be used as a term referring to the same component. In addition, the storage device 300 may include a plurality of memory packages, and each of the plurality of memory packages may include at least one of the plurality of nonvolatile memories 320a, 320b and 320c.

In some example embodiments, each of the plurality of nonvolatile memories 320a, 320b and 320c may include a NAND flash memory. In other example embodiments, each of the plurality of nonvolatile memories 320a, 320b and 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The buffer memory 330 may store instructions and/or data that are executed and/or processed by the storage controller 310, and may temporarily store data stored in or to be stored into the plurality of nonvolatile memories 320a, 320b and 320c. For example, the buffer memory 330 may include at least one of various volatile memories, e.g., a dynamic random access memory (DRAM), a static random access memory (SRAM), or the like.

In some example embodiments, the storage device 300 may be a solid state drive (SSD). For example, the storage device 300 may be a key-value SSD using the variable size mapping or unstructured data management or a SSD that compresses and stores data internally. In other example embodiments, the storage device 300 may be one of a universal flash storage (UFS), a multimedia card (MMC), an embedded multimedia card (eMMC), a secure digital (SD) card, a micro SD card, a memory stick, a chip card, a universal serial bus (USB) card, a smart card, a compact flash (CF) card, or the like.

In some example embodiments, the storage device 300 may be connected to the host device 200 through a block accessible interface which may include, for example, a UFS, an eMMC, a serial advanced technology attachment (SATA) bus, a nonvolatile memory express (NVMe) bus, a serial attached SCSI (SAS) bus, or the like. The storage device 300 may use a block accessible address space corresponding to an access size of the plurality of nonvolatile memories 320a, 320b and 320c to provide the block accessible interface to the host device 200, for allowing the access by units of a memory block with respect to data stored in the plurality of nonvolatile memories 320a, 320b and 320c.

In some example embodiments, the storage system 100 may be any computing system, such as a personal computer (PC), a server computer, a data center, a workstation, a digital television, a set-top box, a navigation system, etc. In other example embodiments, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Figure 3:
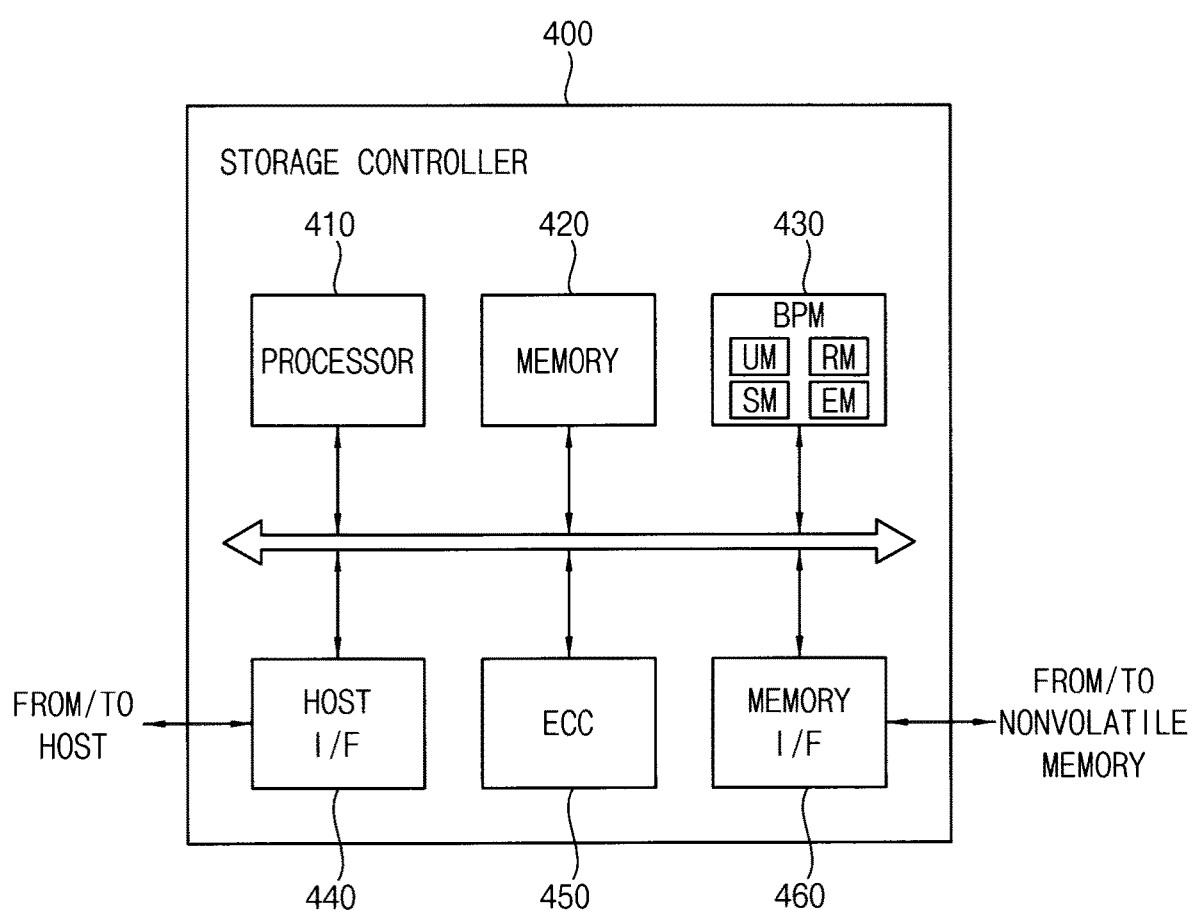
FIG. 3 is a block diagram illustrating an example of a storage controller included in a storage device according to example embodiments.

FIG. 3 is a block diagram illustrating an example of a storage controller included in a storage device according to example embodiments.

Referring to FIG. 3, a storage controller 400 may include at least one processor 410, a memory 420, a buffering policy manager 430, a host interface 440, an error correction code (ECC) block 450 and a memory interface 460.

The processor 410 may control an operation of the storage controller 400 in response to a command received via the host interface 440 from a host device (e.g., the host device 200 in FIG. 2). In some example embodiments, the processor 410 may control respective components by employing firmware for operating a storage device (e.g., the storage device 300 in FIG. 2).

The memory 420 may store instructions and data executed and processed by the processor 410. For example, the memory 420 may be implemented with a volatile memory device with relatively small capacity and high speed, such as a static random access memory (SRAM), a cache memory, or the like.

The buffering policy manager 430 for setting and/or determining the buffering policy may be substantially the same as the buffering policy manager 312 in FIG. 2. The buffering policy manager 430 may include a usage monitoring unit UM for checking a usage of an internal resource which will be described with reference to FIG. 6, a reading performance monitoring unit RM for checking a reading performance which will be described with reference to FIG. 8, a data size monitoring unit SM for checking an average size of recently stored data which will be described with reference to FIG. 9, an external signal monitoring unit EM for checking a policy setting signal provided from the host device 200 which will be described with reference to FIG. 11, and the like.

The ECC block 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 440 may provide physical connections between the host device 200 and the storage device 300. The host interface 440 may provide an interface corresponding to a bus format of the host for communication between the host device 200 and the storage device 300. In some example embodiments, the bus format of the host device 200 may be a small computer system interface (SCSI) or a serial attached SCSI (SAS) interface. In other example embodiments, the bus format of the host device 200 may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The memory interface 460 may exchange data with nonvolatile memories (e.g., the nonvolatile memories 320a, 320b and 320c in FIG. 2). The memory interface 460 may transfer data to the nonvolatile memories 320a, 320b and 320c, or may receive data read from the nonvolatile memories 320a, 320b and 320c. In some example embodiments, the memory interface 460 may be connected to the nonvolatile memories 320a, 320b and 320c via one channel. In other example embodiments, the memory interface 460 may be connected to the nonvolatile memories 320a, 320b and 320c via two or more channels.

Figure 4:
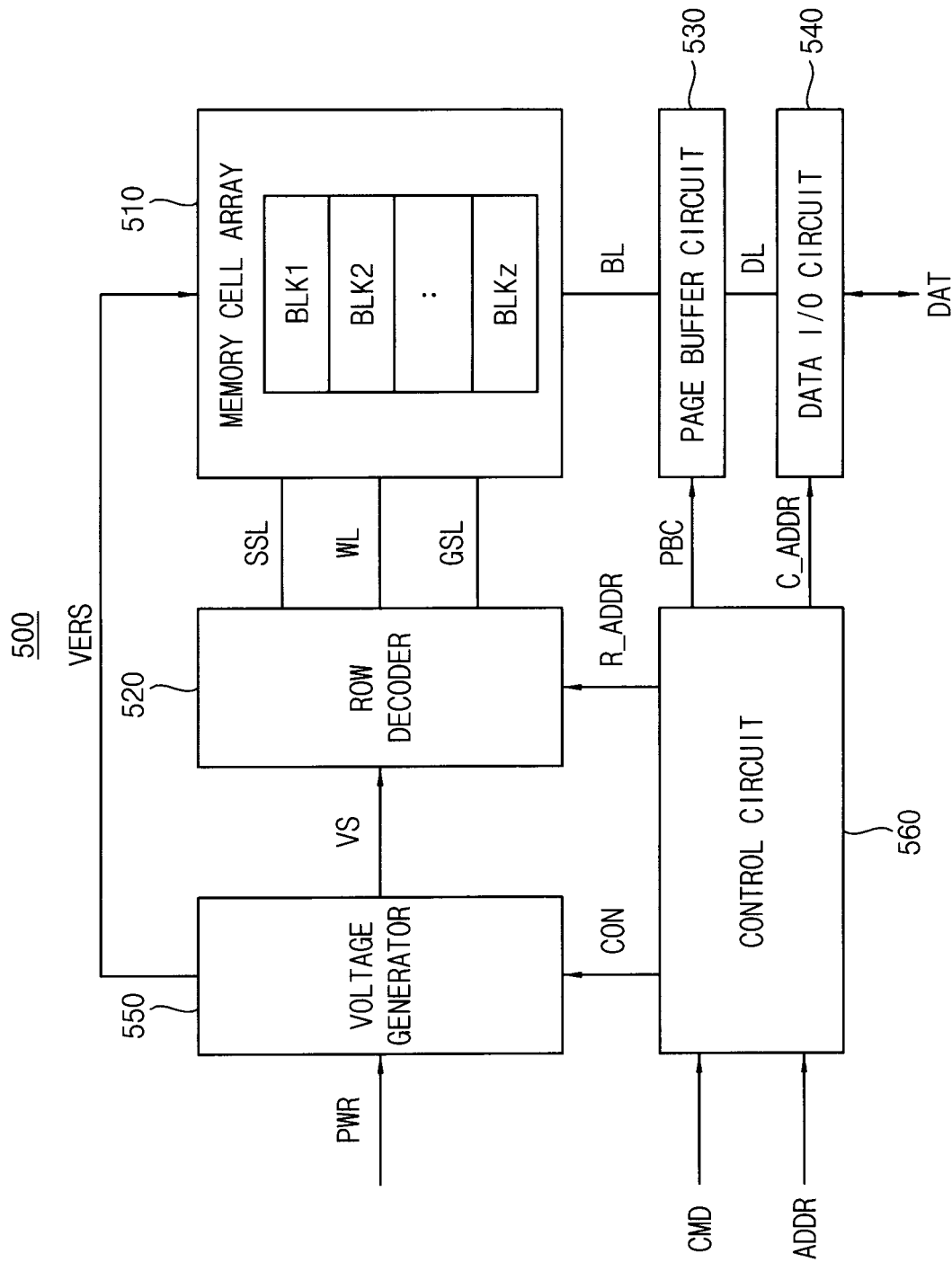
FIG. 4 is a block diagram illustrating an example of a nonvolatile memory included in a storage device according to example embodiments.

FIG. 4 is a block diagram illustrating an example of a nonvolatile memory included in a storage device according to example embodiments.

Referring to FIG. 4, a nonvolatile memory 500 includes a memory cell array 510, a row decoder 520, a page buffer circuit 530, a data input/output (I/O) circuit 540, a voltage generator 550 and a control circuit 560.

The memory cell array 510 is connected to the row decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the plurality of memory blocks BLK1, BLK2, . . . , BLKz may be divided into a plurality of pages.

In some example embodiments, the plurality of memory cells may be arranged in a two dimensional (2D) array structure or a three dimensional (3D) vertical array structure.

A three-dimensional vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 receives a command CMD and an address ADDR from the outside (e.g., the host device 200 and/or the storage controller 310 in FIG. 2), and control erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the row decoder 520 and may provide the column address C_ADDR to the data I/O circuit 540.

The row decoder 520 may be connected to the memory cell array 510 via the plurality of string selection lines SSL, the plurality of wordlines WL and the plurality of ground selection lines GSL.

For example, in the data erase/write/read operations, the row decoder 520 may determine at least one of the plurality of wordlines WL as a selected wordline, and may determine the rest or remainder of the plurality of wordlines WL other than the selected wordline as unselected wordlines, based on the row address R_ADDR.

In addition, in the data erase/write/read operations, the row decoder 520 may determine at least one of the plurality of string selection lines SSL as a selected string selection line, and may determine the rest or remainder of the plurality of string selection lines SSL other than the selected string selection line as unselected string selection lines, based on the row address R_ADDR.

Further, in the data erase/write/read operations, the row decoder 520 may determine at least one of the plurality of ground selection lines GSL as a selected ground selection line, and may determine the rest or remainder of the plurality of ground selection lines GSL other than the selected ground selection line as unselected ground selection lines, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the row decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

For example, during the erase operation, the voltage generator 550 may apply the erase voltage VERS to a common source line and/or the bitline BL of a memory block (e.g., a selected memory block) and may apply an erase permission voltage (e.g., a ground voltage) to all wordlines of the memory block or a portion of the wordlines via the row decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the row decoder 520. In addition, during the program verification operation, the voltage generator 550 may apply a program verification voltage to the selected wordline and may apply a verification pass voltage to the unselected wordlines via the row decoder 520.

In addition, during the normal read operation, the voltage generator 550 may apply a read voltage to the selected wordline and may apply a read pass voltage to the unselected wordlines via the row decoder 520. During the data recover read operation, the voltage generator 550 may apply the read voltage to a wordline adjacent to the selected wordline and may apply a recover read voltage to the selected wordline via the row decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from an outside of the nonvolatile memory 500 to the memory cell array 510 via the page buffer circuit 530 or may provide the data DAT from the memory cell array 510 to the outside of the nonvolatile memory 500, based on the column address C_ADDR.

FIGS. 5A, 5B, 5C and 5D are diagrams for describing a method of managing data in a storage device based on a variable size mapping according to example embodiments.

Figure 5A:
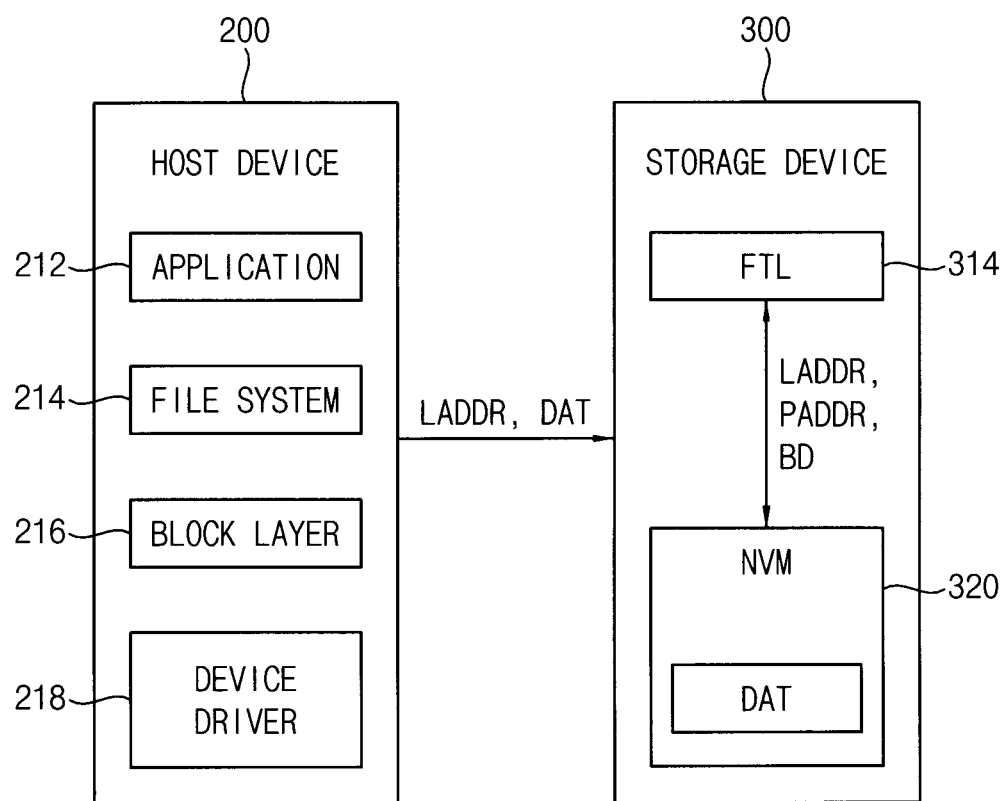
FIGS. 5A, 5B, 5C and 5D are diagrams for describing a method of managing data in a storage device based on a variable size mapping according to example embodiments.

Referring to FIG. 5A, the host device 200 may include an application 212, a file system 214, a block layer 216 and a device driver 218. The storage device 300 may include a flash translation layer 314 and at least one nonvolatile memory 320. The application 212, the file system 214, the block layer 216 and the device driver 218 of the host device 200 may be referred to as a high level. The flash translation layer 314 and the nonvolatile memory 320 of the storage device 300 may be referred to as a low level.

The application 212 may be an application software program that is executed on an operating system. For example, the application 212 has been programmed to aid in generating, copying and deleting a file.

The file system 214 may manage files used by the host device 200. For example, the file system 214 may manage file names, extensions, file attributes, file sizes, cluster information, etc. of files accessed by requests from the host device 200 or applications executed by the host device 200. The file system 214 may generate, delete and manage data on a file basis.

The block layer 216 may be referred to as a block input/output layer, and may perform data read/write operations by units of a memory block. In other words, the block accessible interface may be implemented based on the block layer 216.

The device driver 218 may control the storage device 300 at the operating system level. For example, the device driver 218 may be a software module of a kernel for controlling the storage device 300. The host device 200 or the applications executed by the host device 200 may request the data read/write operations to the storage device 300 via the device driver 218.

The flash translation layer 314 may be controlled by the storage controller 310. The flash translation layer 314 may translate a logical address provided from the host device 200 into a physical address of the nonvolatile memory 320, and may manage data stored in the nonvolatile memory 320. The flash translation layer 314 may be loaded by and stored in the buffer memory 330.

The nonvolatile memory 320 may be substantially the same as the nonvolatile memories 320a, 320b and 320c in FIG. 2. For example, the nonvolatile memory 320 may store meta data, user data, or the like, and may perform data read/write/erase operations.

The method of managing data in the storage device of FIG. 1 will be described with reference to FIG. 5A.

The host device 200 may transmit first data DAT having an unfixed size and a first logical address LADDR corresponding thereto to the storage device 300. When it is impossible to store the first data DAT in a single page, the storage device 300 may determine a buffering policy for the first data DAT based on at least one selection parameter, and may store a first buffering direction BD representing the buffering policy for the first data DAT together with a mapping result while mapping the first logical address LADDR of the first data DAT and a first physical address PADDR of pages in the nonvolatile memory 320 in which the first data DAT is stored. The above-described determination and setting operation may be performed by the buffering policy manager 312, and the above-described information may be stored in a mapping table in the flash translation layer 314. When it is possible to store the first data DAT in the single page, the operations of setting the buffering policy and storing the first buffering direction BD among the above-described operations may be omitted.

Figure 5B:
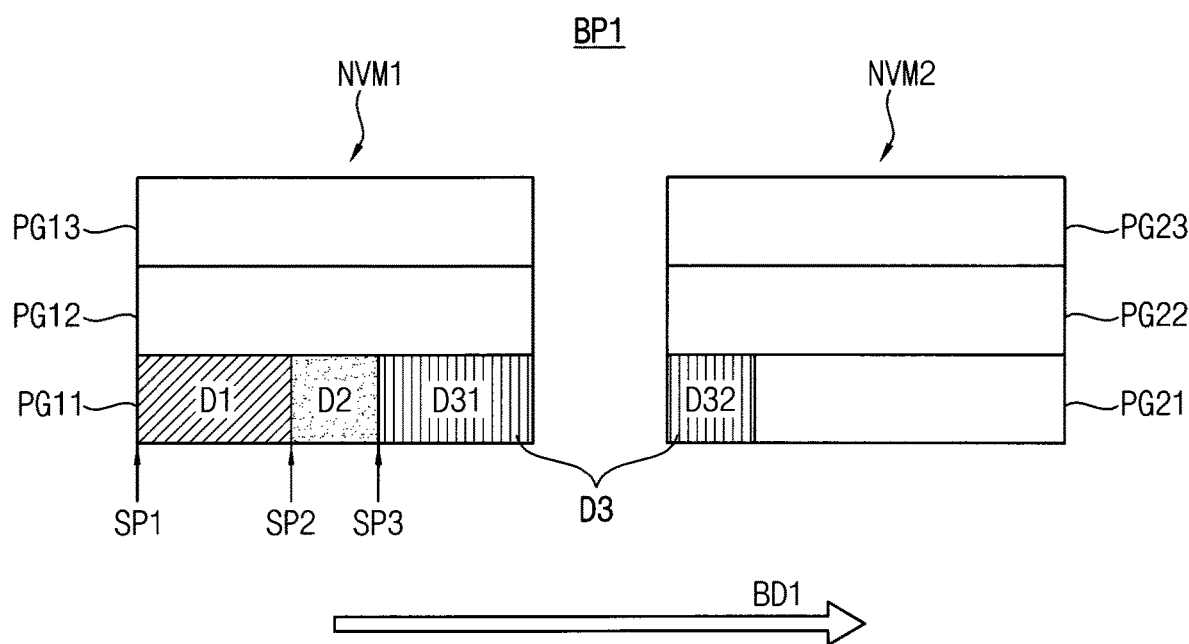

Referring to FIG. 5B, a first buffering policy BP1 among the buffering policies set by the buffering policy manager 312 is illustrated.

The first buffering policy BP1 may represent a buffering policy in which data that cannot be stored in the single page is stored in different pages included in different nonvolatile memory chips. In other words, the first buffering policy BP1 may represent that data is subsequently buffered on different chips.

In the example of FIG. 5B, nonvolatile memory chips NVM1 and NVM2 may be different from each other and may be physically distinct or distinguished from each other. The nonvolatile memory chip NVM1 may include pages PG11, PG12 and PG13, and the nonvolatile memory chip NVM2 may include pages PG21, PG22 and PG23. After data D1 is stored in the page PG11 and data D2 is stored in the page PG11, data D3 that does not exactly fit (e.g., is not aligned with) a boundary of the page PG11 may be input. In this example, instead of storing the data D3 in a new empty page, a portion D31 of the data D3 may be stored in the page PG11, another portion D32 of the data D3 may be stored in another page PG21, and thus the pages PG11 and PG21 in which the data D3 is stored may be included in different nonvolatile memory chips NVM1 and NVM2. In addition, as will be described with reference to FIG. 5D, starting positions SP1, SP2 and SP3 of the data D1, D2 and D3 in the page PG11 may also be stored. Generally, D1, D2 and D3 may be referred to as data objects having a size, for example, a number of bytes. For example, D1 may be a data object with a size less than a page size of the nonvolatile memory 320A. D1 may a final portion of a larger data chunk, all of which other than D1 has already been stored in memory pages.

When the first buffering policy BP1 is applied, a reading performance may be improved because fragmented data are read from different memory chips simultaneously, however, the amount of data that should be maintained by the firmware until when the content of all pages is filled or completed may increase. The first buffering policy BP1 may be useful when the size of each piece of data is relatively large and the number of data stored in one page is relatively small. For example, a buffering direction BD1 of the first buffering policy BP1 may indicate an arrangement direction of the nonvolatile memory chips NVM1 and NVM2.

Figure 5C:
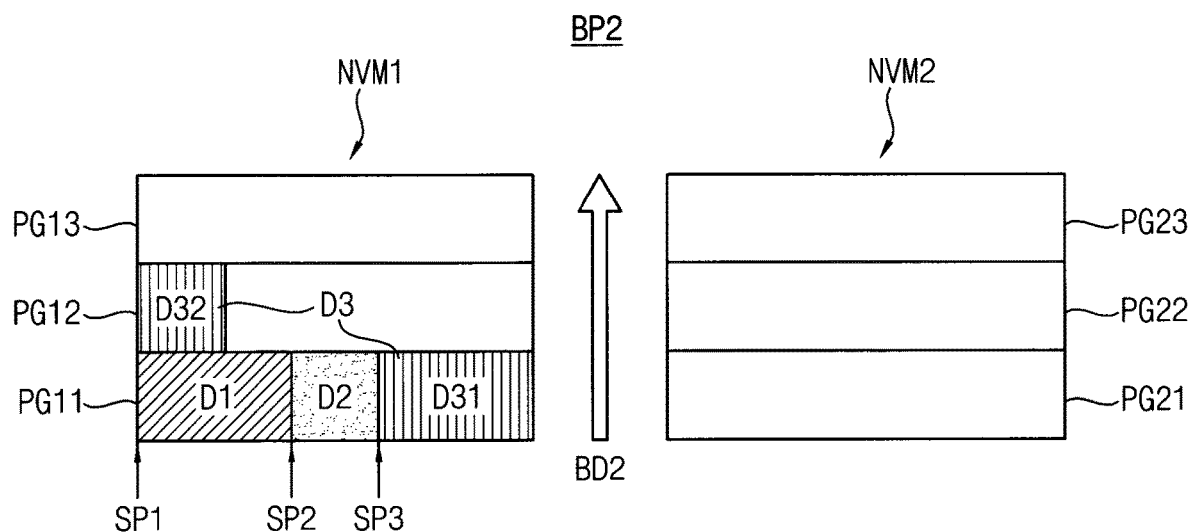

Referring to FIG. 5C, a second buffering policy BP2 among the buffering policies set by the buffering policy manager 312 is illustrated.

The second buffering policy BP2 may represent a buffering policy in which data that cannot be stored in the single page is stored in different pages included in the same nonvolatile memory chip. In other words, the second buffering policy BP2 may represent that buffering is continued on the same chip so as to complete one chip or block.

In the example of FIG. 5C, the descriptions repeated with FIG. 5B will be omitted. A portion D31 of the data D3 may be stored in the page PG11, another portion D32 of the data D3 may be stored in another page PG12, and thus the pages PG11 and PG12 in which the data D3 is stored may be included in the same nonvolatile memory chip NVM1.

When the second buffering policy BP2 is applied, a reading performance may be degraded because read requests are concentrated on the same memory chip, however, internal resources may be saved because the storage device 300 only needs to maintain a relatively small number of buffers. The second buffering policy BP2 may be useful when there are many small-sized data. For example, a buffering direction BD2 of the second buffering policy BP2 may indicate an arrangement direction of the pages PG11, PG12 and PG13 in the nonvolatile memory chip NVM1.

Figures 5D, 6:
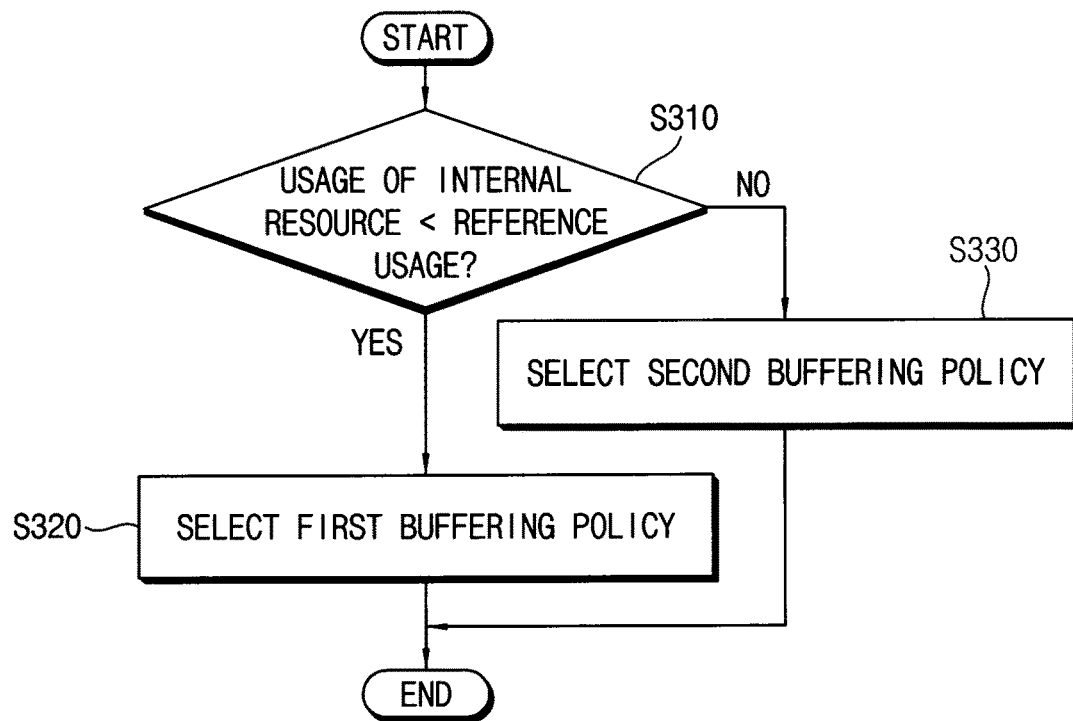
FIG. 6 is a flowchart illustrating an example of setting a buffering policy in FIG. 1.

Referring to FIG. 5D, a mapping table in the flash translation layer 314 is illustrated.

The mapping table may include logical addresses LA1, LA2 and LA3, physical addresses, buffering directions and sizes SZ1, SZ2 and SZ3 of data (e.g., a chunk of data or data objects) D1, D2 and D3. In some example embodiments, the sizes SZ1, SZ2 and SZ3 may be omitted.

In some example embodiments, each physical address may include a position (or location) of a page and a starting position of data. For example, in cases of the data D1 and D2 stored in one page, the physical addresses of the data D1 and D2 may include information of the page PG11 in which the data D1 and D2 are stored and starting positions SP1 and SP2 of the data D1 and D2 in the page PG11, respectively. For example, in a case of the data D3 stored across several pages, the physical address of the data D3 may include information of the foremost (or front) page PG11 among the pages in which the data D3 is stored and a starting position SP3 of the data D3 in the foremost page PG11.

In some example embodiments, the buffering direction may be stored only for the data D3 stored across several pages, and the buffering direction may not be stored for the data D1 and D2 stored in one page because the buffering direction does not exist.

A data read operation which will be described with reference to FIG. 17 and a garbage collection operation which will be described with reference to FIG. 19 may be performed using the mapping table illustrated in FIG. 5D.

Figure 7A:
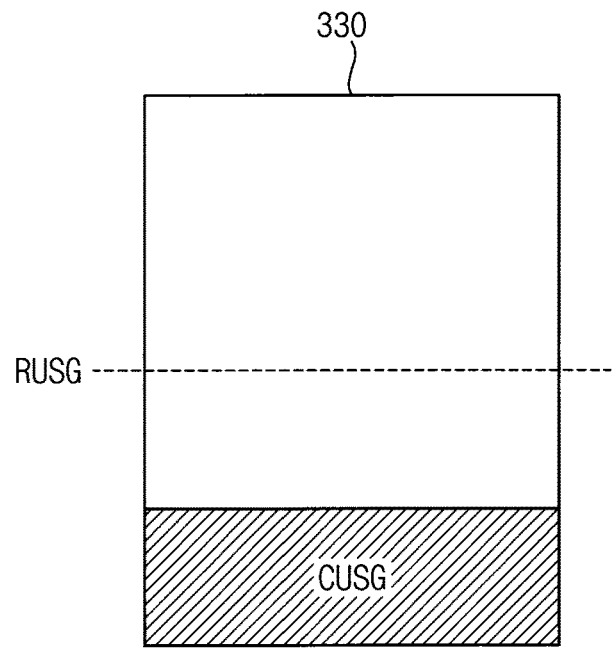
FIGS. 7A and 7B are diagrams for describing an operation of setting a buffering policy of FIG. 6.
Figure 7B:
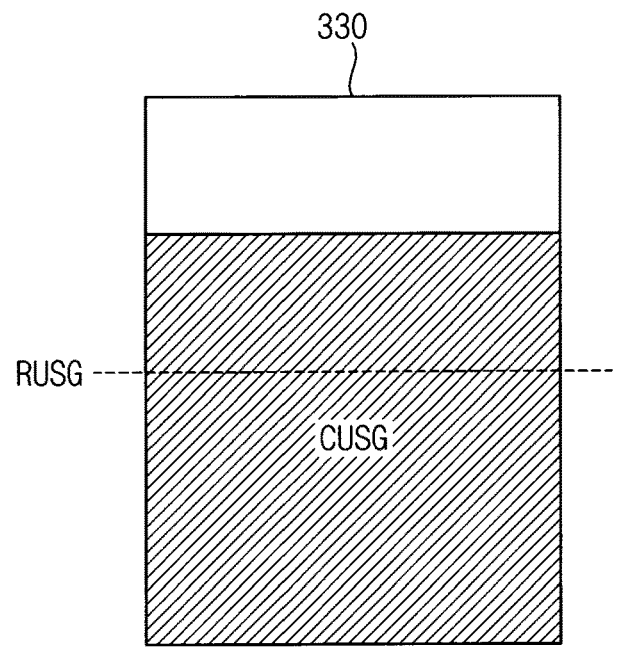

FIG. 6 is a flowchart illustrating an example of setting a buffering policy in FIG. 1. FIGS. 7A and 7B are diagrams for describing an operation of setting a buffering policy of FIG. 6.

Referring to FIGS. 1, 6, 7A and 7B, when setting the buffering policy for the first data based on the at least one selection parameter (operation S300), the at least one selection parameter may include a usage of an internal resource associated with a data write operation. For example, as illustrated in FIGS. 7A and 7B, the usage of the internal resource may represent a current usage CUSG (e.g., a hatched portion) of the buffer memory 330.

When the usage of the internal resource is less than a reference usage RUSG (operation S310: YES), this means that the internal resource is sufficient or enough, and thus the first buffering policy BP1 of FIG. 5B may be selected as the buffering policy for the first data (operation S320). FIG. 7A illustrates a case where the current usage CUSG of the buffer memory 330 is less than the reference usage RUSG.

When the usage of the internal resource is greater than or equal to the reference usage (operation S310: NO), this means that the internal resource is insufficient, and thus the second buffering policy BP2 of FIG. 5C may be selected as the buffering policy for the first data (operation S330) in order to save the internal resource. FIG. 7B illustrates a case where the current usage CUSG of the buffer memory 330 is greater than the reference usage RUSG.

The operation of FIG. 6 may be performed by the usage monitoring unit UM included in the buffering policy manager 430 of FIG. 3.

Figure 8:
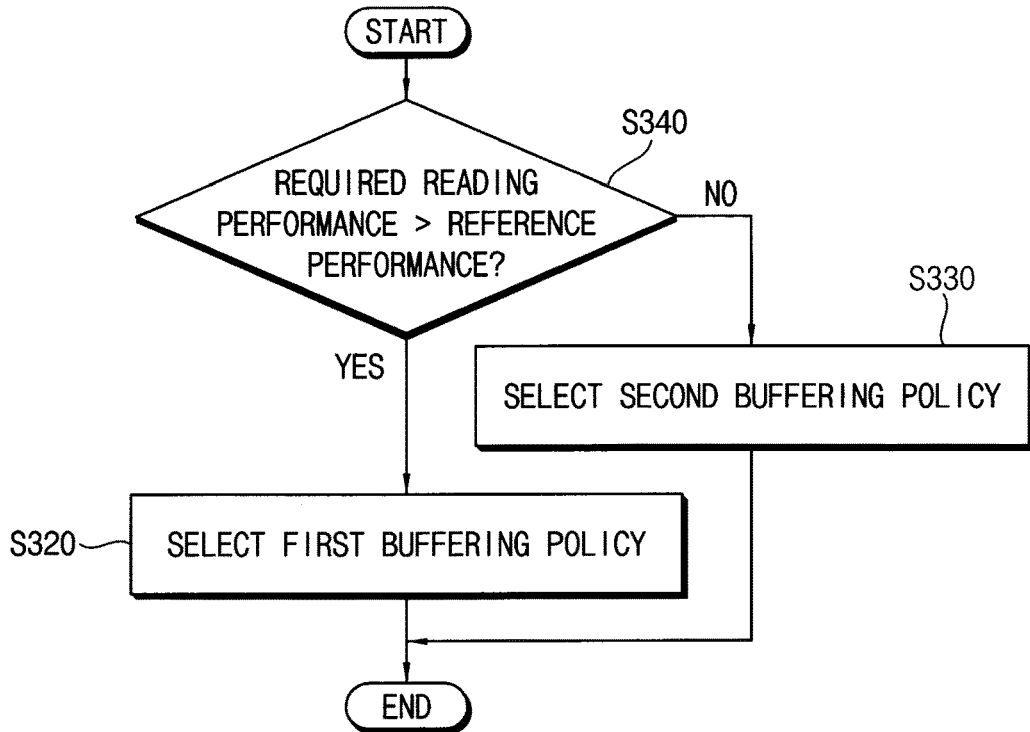
FIG. 8 is a flowchart illustrating another example of setting a buffering policy in FIG. 1.

FIG. 8 is a flowchart illustrating another example of setting a buffering policy in FIG. 1.

Referring to FIGS. 1 and 8, when setting the buffering policy for the first data based on the at least one selection parameter (operation S300), the at least one selection parameter may include a reading performance associated with a data read operation.

When the reading performance higher than a reference performance is required (operation S340: YES), the first buffering policy BP1 of FIG. 5B may be selected as the buffering policy for the first data (operation S320) in order to improve or enhance the reading performance. When the reading performance lower than or equal to the reference performance is required (operation S340: NO), the second buffering policy BP2 of FIG. 5C may be selected as the buffering policy for the first data (operation S330).

The operation of FIG. 8 may be performed by the reading performance monitoring unit RM included in the buffering policy manager 430 of FIG. 3.

Figure 9:
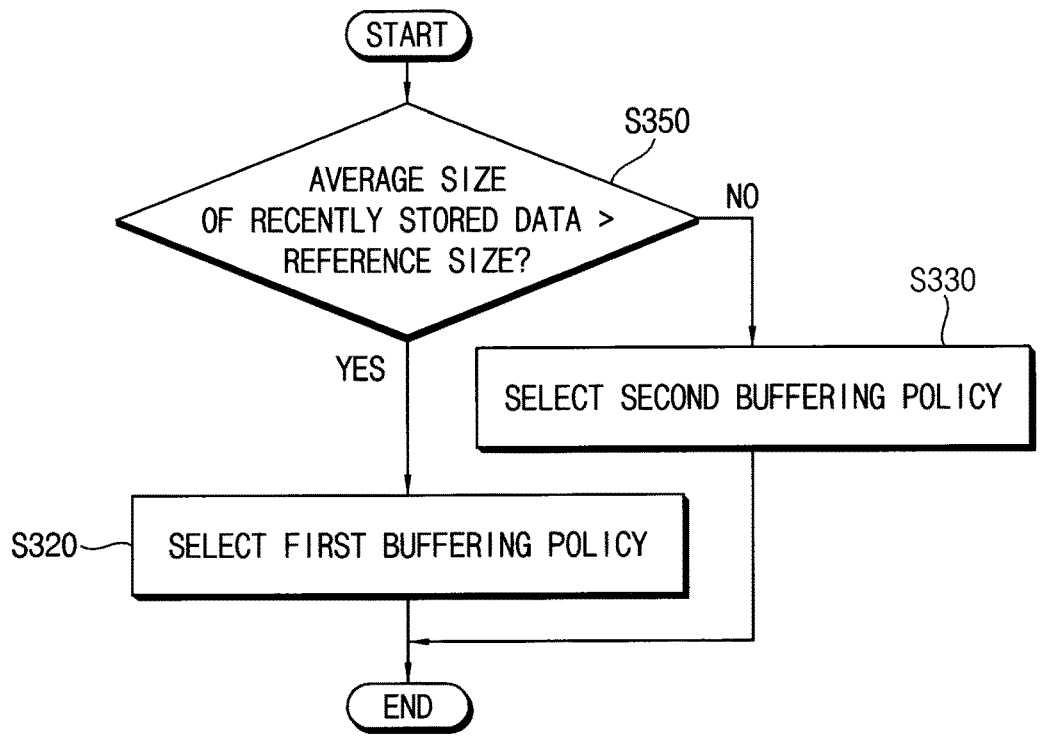
FIG. 9 is a flowchart illustrating still another example of setting a buffering policy in FIG. 1.
Figure 10A:
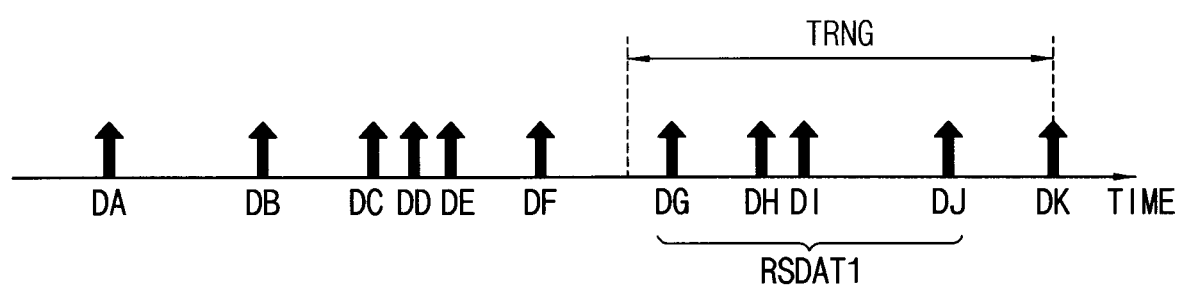
FIGS. 10A and 10B are diagrams for describing an operation of setting a buffering policy of FIG. 9.
Figure 10B:
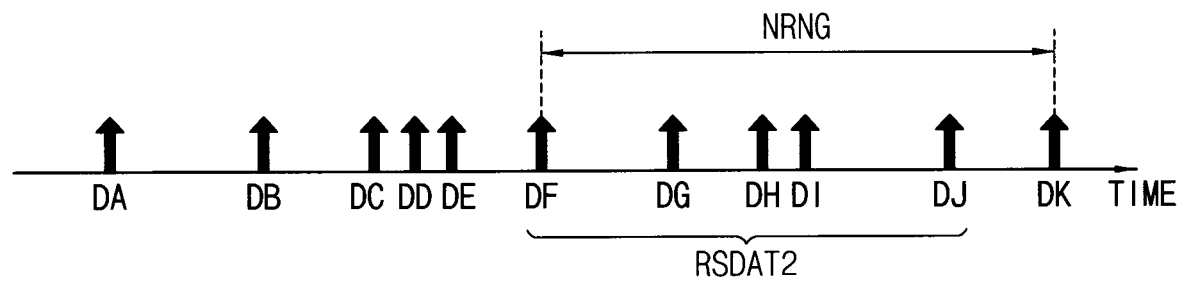

FIG. 9 is a flowchart illustrating still another example of setting a buffering policy in FIG. 1. FIGS. 10A and 10B are diagrams for describing an operation of setting a buffering policy of FIG. 9.

Referring to FIGS. 1, 9, 10A and 10B, when setting the buffering policy for the first data based on the at least one selection parameter (operation S300), the at least one selection parameter may include an average size of recently stored data among a plurality of data stored in the storage device 300.

In some example embodiments, as illustrated in FIG. 10A, the recently stored data may be data DG, DH, DI and DJ among a plurality of data DA, DB, DC, DD, DE, DF, DG, DH, DI, DJ and DK that are sequentially stored in the storage device 300. The data DG, DH, DI and DJ may represent data stored in the storage device 300 within a range TRNG of a predetermined time interval immediately before the latest data DK is stored.

In other example embodiments, as illustrated in FIG. 10B, the recently stored data may be data DF, DG, DH, DI and DJ among the plurality of data DA, DB, DC, DD, DE, DF, DG, DH, DI, DJ and DK that are sequentially stored in the storage device 300. The data DF, DG, DH, DI and DJ may represent data stored in the storage device 300 within a range NRNG of a predetermined number of times immediately before the latest data DK is stored. For example, the range NRNG of the predetermined number of times may be five in the example of FIG. 10B.

When the average size of the recently stored data is greater than a reference size (operation S350: YES), this means that the size of each piece of data is relatively large, and thus the first buffering policy BP1 of FIG. 5B may be selected as the buffering policy for the first data (operation S320). When the average size of the recently stored data is less than or equal to the reference size (operation S350: NO), this means that there are a lot of small-sized data, and thus the second buffering policy BP2 of FIG. 5C may be selected as the buffering policy for the first data (operation S330).

The operation of FIG. 9 may be performed by the data size monitoring unit SM included in the buffering policy manager 430 of FIG. 3.

Figure 11:
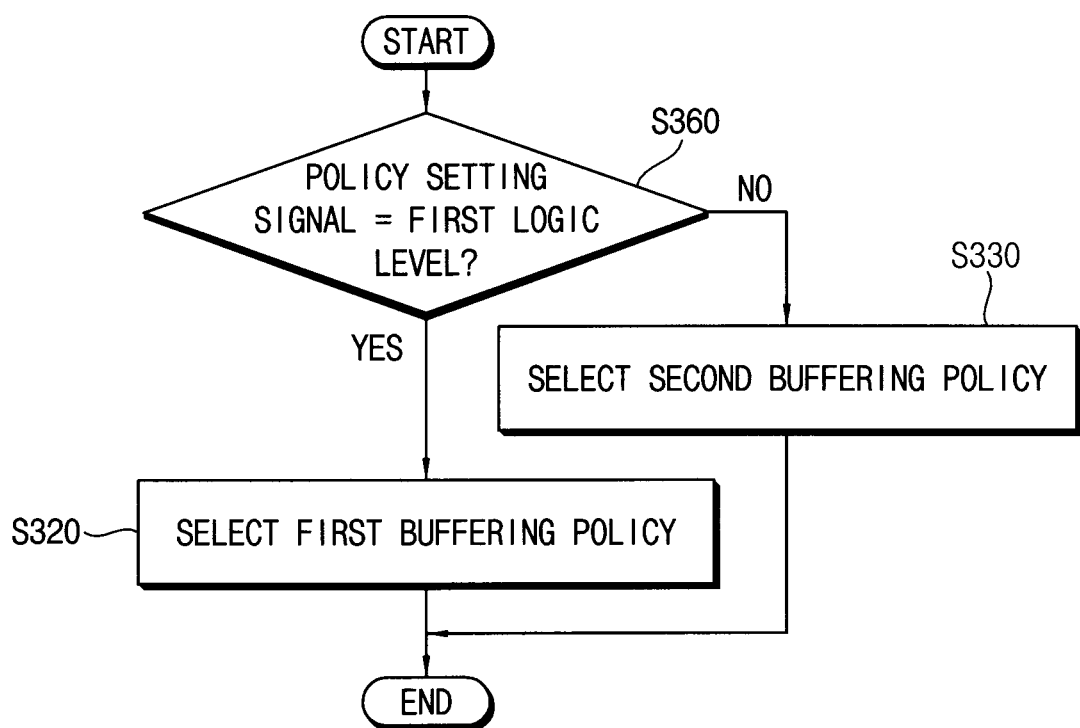
FIG. 11 is a flowchart illustrating still another example of setting a buffering policy in FIG. 1.
Figure 12:
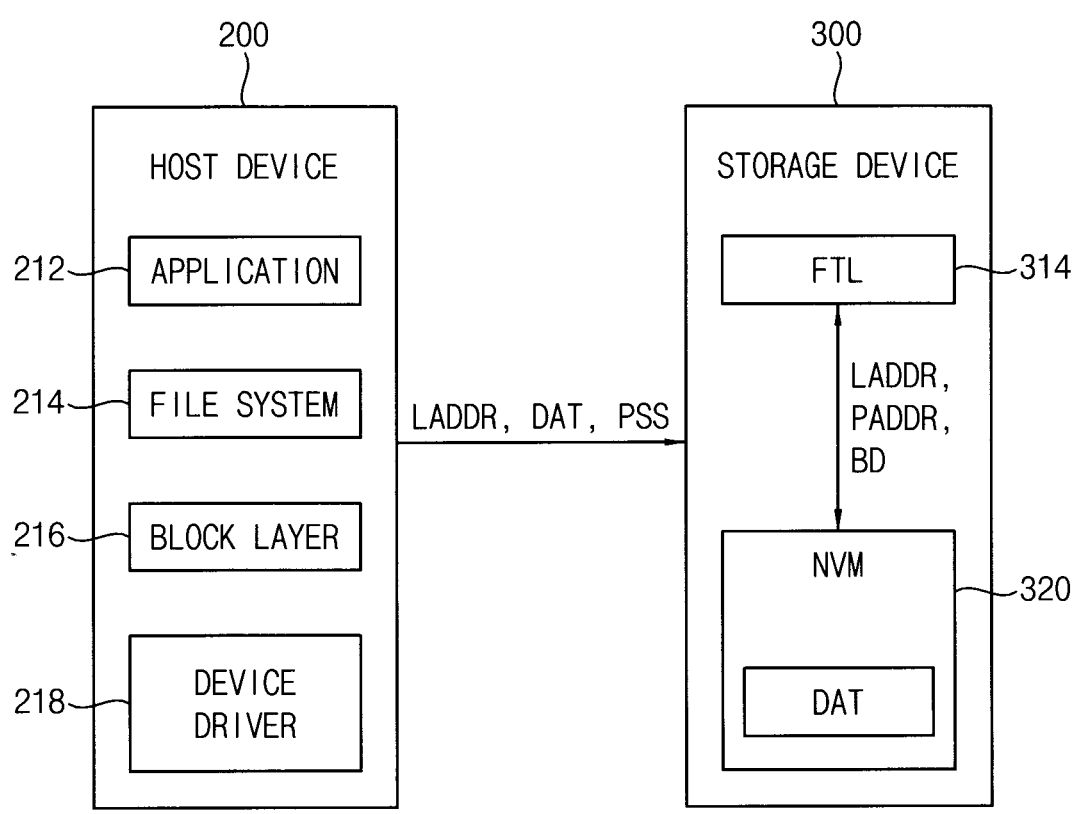
FIG. 12 is a diagram for describing an operation of setting a buffering policy of FIG. 11.

FIG. 11 is a flowchart illustrating still another example of setting a buffering policy in FIG. 1. FIG. 12 is a diagram for describing an operation of setting a buffering policy of FIG. 11.

Referring to FIGS. 1, 11 and 12, when setting the buffering policy for the first data based on the at least one selection parameter (operation S300), the at least one selection parameter may include a policy setting signal provided from the host device 200. For example, as illustrated in FIG. 12, the host device 200 may transmit a policy setting signal PSS to the storage device 300 together with the first data DAT and the first logical address LADDR.

When the policy setting signal PSS has a first logic level for the first buffering policy BP1 (operation S360: YES), the first buffering policy BP1 of FIG. 5B may be selected as the buffering policy for the first data (operation S320). When the policy setting signal PSS has a second logic level for the second buffering policy BP2 (operation S360: NO), the second buffering policy BP2 of FIG. 5C may be selected as the buffering policy for the first data (operation S330).

The operation of FIG. 11 may be performed by the external signal monitoring unit EM included in the buffering policy manager 430 of FIG. 3.

In some example embodiments, the method of managing data in the storage device according to example embodiments may be implemented by combining two or more of the examples of FIGS. 6, 8, 9 and 11. In other words, the buffering policy may be set in consideration of two or more selection parameters together. In other example embodiments, various parameters may be used in addition to the above-described parameters.

Figure 13:
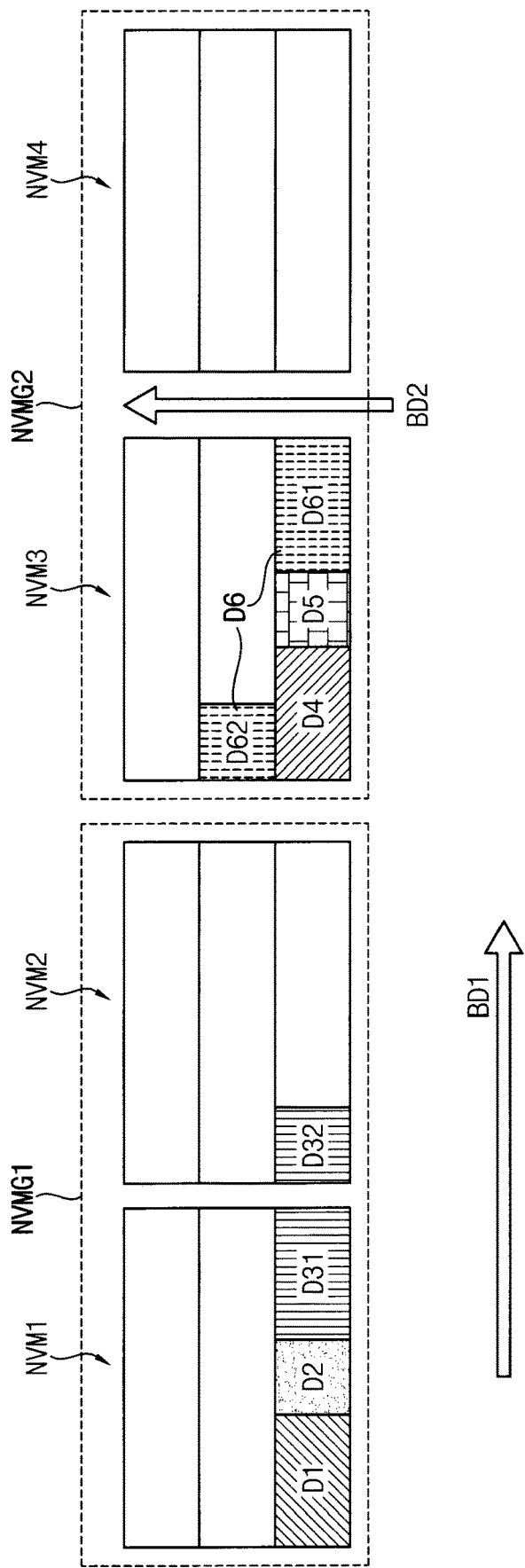
FIG. 13 is a diagram for describing a method of managing data in a storage device based on a variable size mapping according to example embodiments.

FIG. 13 is a diagram for describing a method of managing data in a storage device based on a variable size mapping according to example embodiments. The descriptions repeated with FIGS. 5B and 5C will be omitted.

Referring to FIG. 13, the buffering policy manager 312 may group nonvolatile memory chips and may selectively apply the first buffering policy BP1 of FIG. 5B and the second buffering policy BP2 of FIG. 5C for each group.

For example, a plurality of nonvolatile memory chips NVM1, NVM2, NVM3 and NVM4 may be divided into a first group NVMG1 including the nonvolatile memory chips NVM1 and NVM2 and a second group NVMG2 including the nonvolatile memory chips NVM3 and NVM4. Different buffering policies may be applied to the first group NVMG1 and the second group NVMG2. For example, the first buffering policy BP1 substantially the same as described with reference to FIG. 5B may be applied to the nonvolatile memory chips NVM1 and NVM2 of the first group NVMG1. The second buffering policy BP2 substantially the same as described with reference to FIG. 5C may be applied to the nonvolatile memory chips NVM3 and NVM4 of the second group NVMG2 such that pages in which a portion D61 and another portion D62 of data D6 received after data D4 and D5 are stored are included in the same nonvolatile memory chip NVM3. The same buffering policy may be applied to some groups.

Although example embodiments are described based on specific numbers of nonvolatile memory chips and groups, example embodiments are not limited thereto, and the numbers of nonvolatile memory chips and groups may be variously changed.

Figure 14:
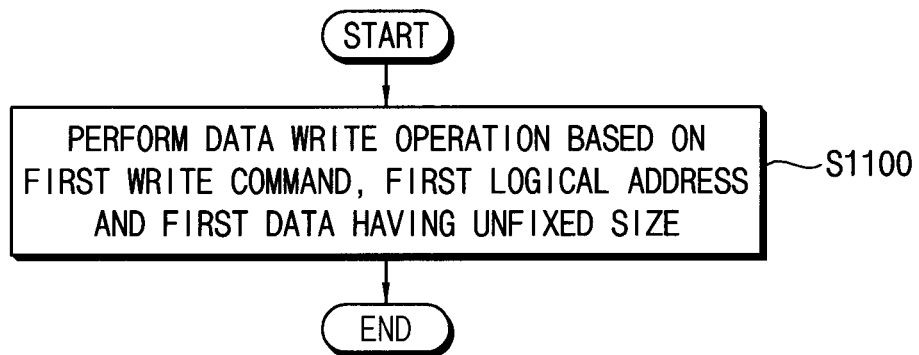
FIG. 14 is a flowchart illustrating a method of operating a storage device according to example embodiments.
Figure 15:
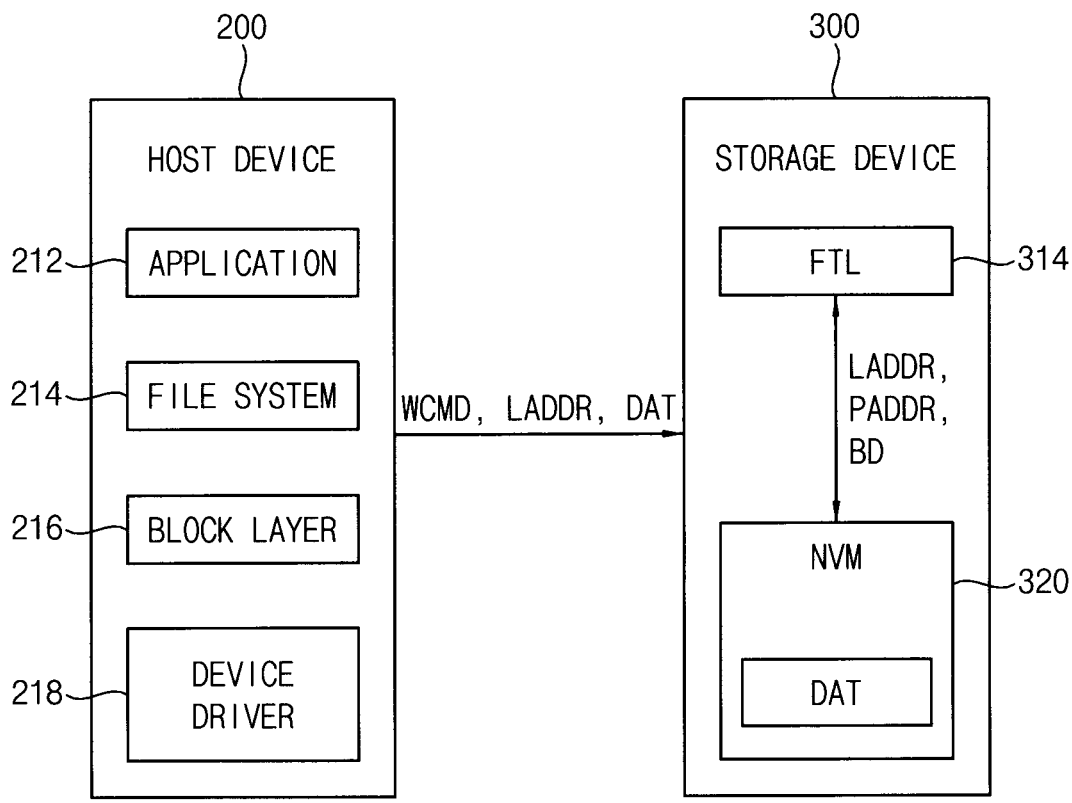
FIG. 15 is a diagram for describing a method of operating a storage device according to example embodiments.

FIG. 14 is a flowchart illustrating a method of operating a storage device according to example embodiments. FIG. 15 is a diagram for describing a method of operating a storage device according to example embodiments. The descriptions repeated with FIGS. 1 and 5A will be omitted.

Referring to FIGS. 14 and 15, a storage device according to example embodiments includes a plurality of nonvolatile memory chips and operates based on a variable size mapping. A configuration of the storage device may be substantially the same as described with reference to FIG. 2.

In the method of operating the storage device according to example embodiments, a data write operation is performed based on a first write command, a first logical address and first data having an unfixed size received from an external host device (operation S1100). For example, as illustrated in FIG. 15, the host device 200 may transmit the first data DAT having an unfixed size and a first write command WCMD and the first logical address LADDR corresponding thereto to the storage device 300, and the storage device 300 may program the first data DAT into one or more pages based on the first write command WCMD and the first logical address LADDR. For example, the first write command WCMD, the first logical address LADDR and the first data DAT may be transmitted based on a file storage request of the application 212, a write request of the file system 214 and an input/output request of the block layer 216.

Figure 16:
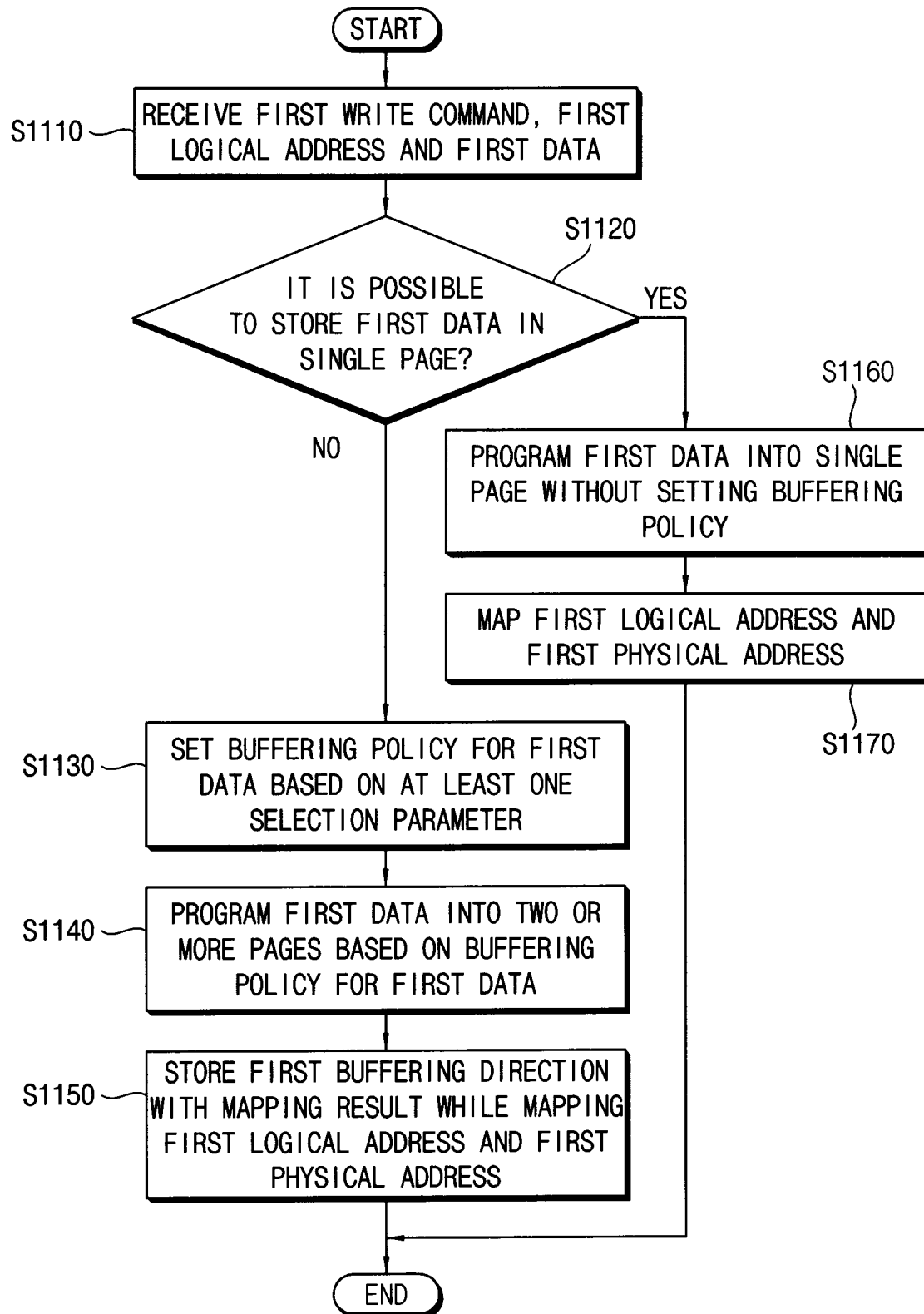
FIG. 16 is a flowchart illustrating an example of performing a data write operation in FIG. 14.

FIG. 16 is a flowchart illustrating an example of performing a data write operation in FIG. 14. The descriptions repeated with FIG. 1 will be omitted.

Referring to FIGS. 14 and 16, when performing the data write operation (operation S1100), the first write command, the first logical address and the first data may be received (operation S1110).

It may be determined whether it is possible to store the first data in a single page among a plurality of pages (operation S1120). When it is impossible to store the first data in the single page (operation S1120: NO), a buffering policy for the first data may be set based on at least one selection parameter (operation S1130), the first data may be programmed into two or more pages based on the buffering policy for the first data (operation S1140), and a first buffering direction representing the buffering policy for the first data may be stored together with a mapping result while mapping the first logical address of the first data and a first physical address of pages in which the first data is stored (operation S1150). Operations S1120, S1130 and S1150 may be substantially the same as operations S200, S300 and S400 in FIG. 1, respectively.

When it is possible to store the first data in the single page (operation S1120: YES), the first data may be programmed into the single page without setting the buffering policy for the first data (operation S1160), and the first logical address and the first physical address may be mapped (operation S1170). Operation S1170 may be substantially the same as operation S500 in FIG. 1.

Figure 17:
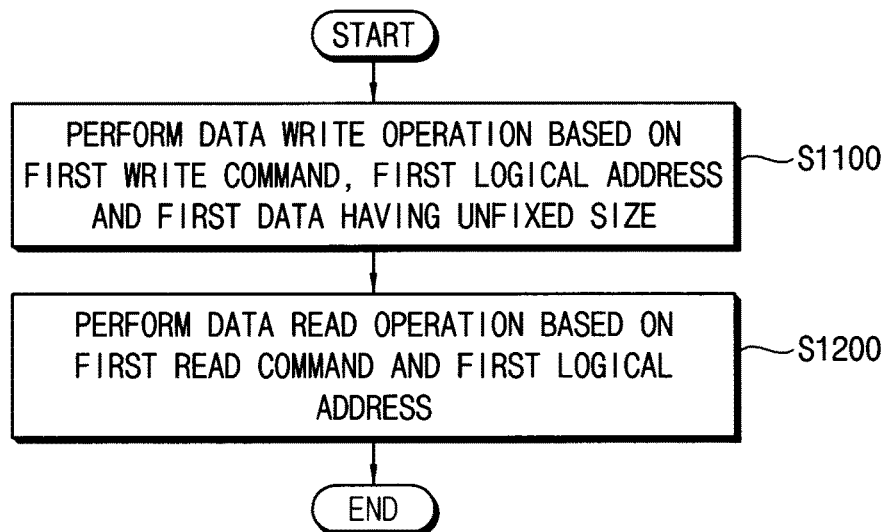
FIG. 17 is a flowchart illustrating a method of operating a storage device according to example embodiments.
Figure 18:
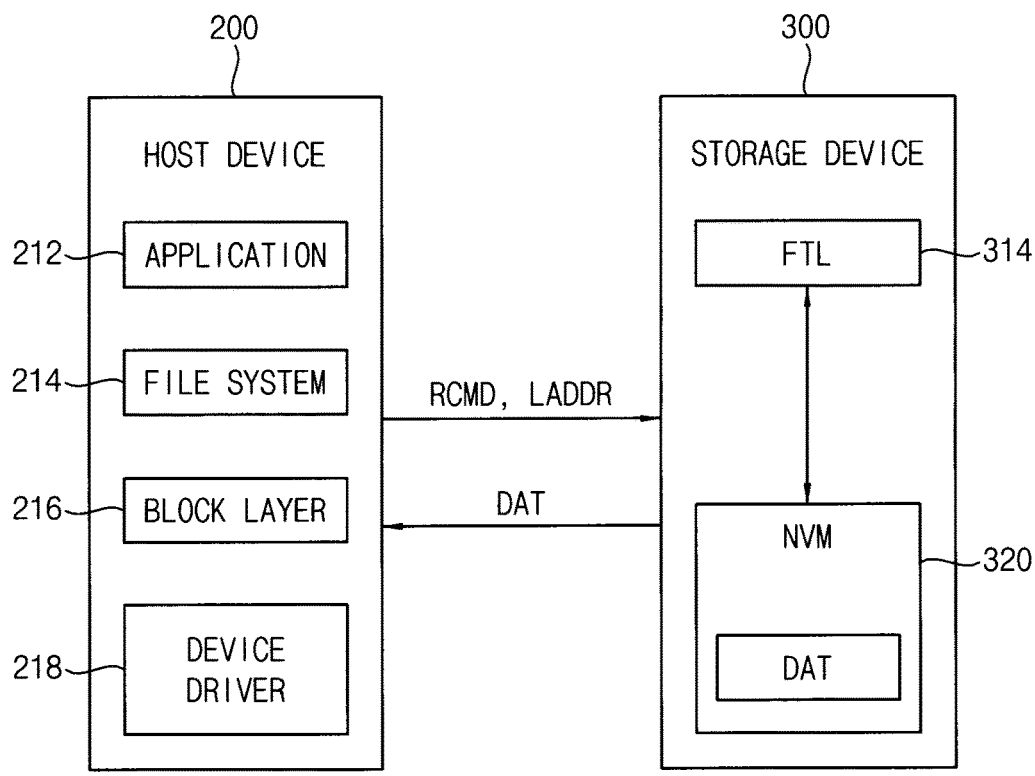
FIG. 18 is a diagram for describing a method of operating a storage device according to example embodiments.

FIG. 17 is a flowchart illustrating a method of operating a storage device according to example embodiments. FIG. 18 is a diagram for describing a method of operating a storage device according to example embodiments. The descriptions repeated with FIGS. 1, 5A and 14 will be omitted.

Referring to FIGS. 17 and 18, in a method of operating a storage device according to example embodiments, operation S1100 in FIG. 17 may be substantially the same as operation S1100 in FIG. 14.

A data read operation is performed based on a first read command and the first logical address received from the external host device (operation S1200). For example, as illustrated in FIG. 18, the host device 200 may transmit a first read command RCMD and the first logical address LADDR for reading the first data DAT to the storage device 300, and the storage device 300 may read the first data DAT based on the first read command RCMD and the first logical address LADDR and may transmit the first data DAT to the host device 200. For example, the first read command RCMD and the first logical address LADDR may be transmitted based on a file request of the application 212, a read request of the file system 214 and an input/output request of the block layer 216. The pages to be read may be efficiently calculated and read using information (e.g., a position of the page, a starting position of the data, a buffering direction, etc.) stored by the method of managing data in the storage device according to example embodiments described with reference to FIGS. 1 through 13.

Figure 19:
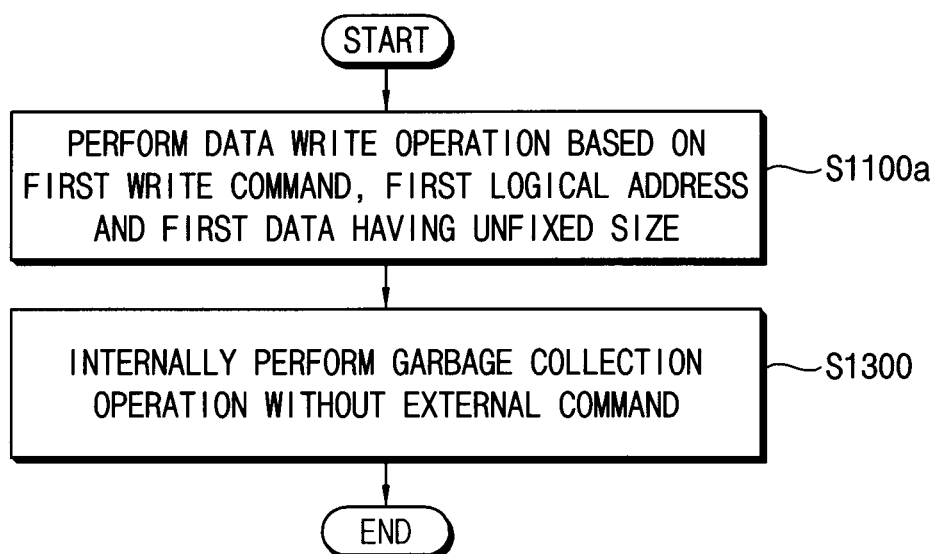
FIG. 19 is a flowchart illustrating a method of operating a storage device according to example embodiments.
Figure 20A:
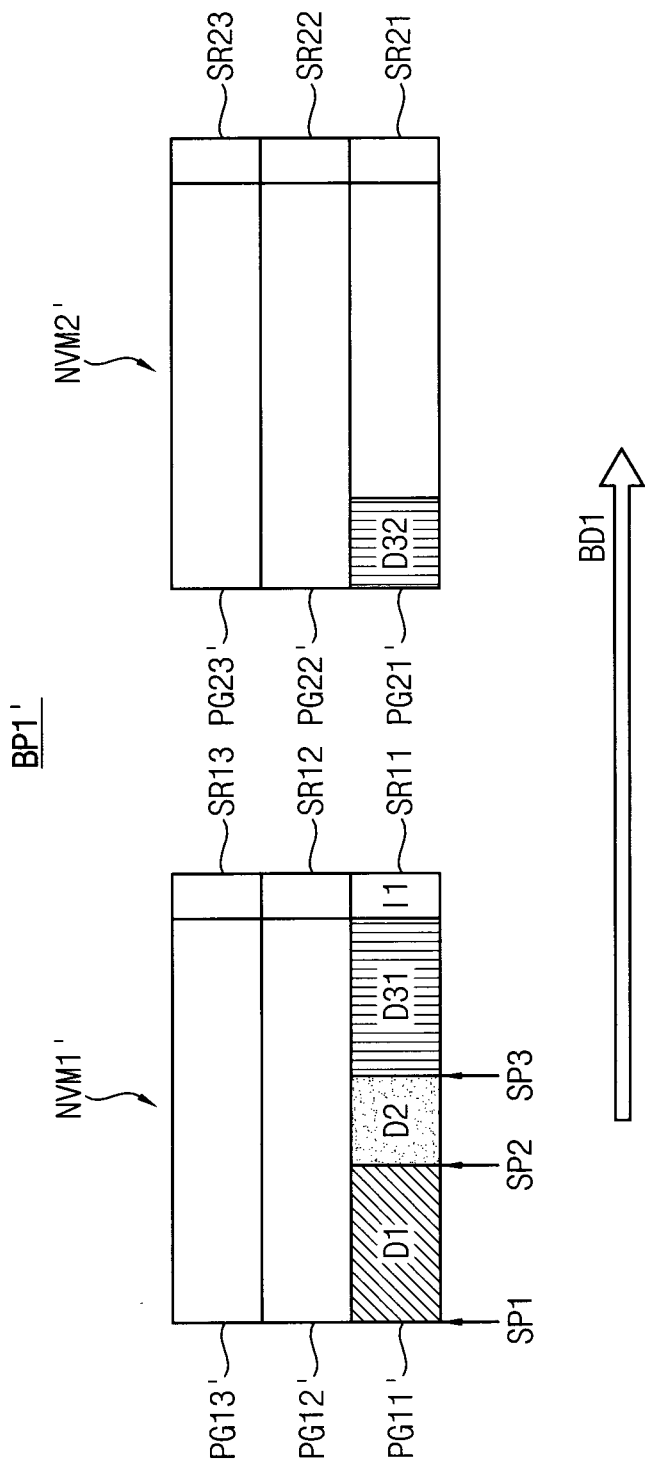
FIGS. 20A and 20B are diagrams for describing a method of operating a storage device according to example embodiments.
Figure 20B:
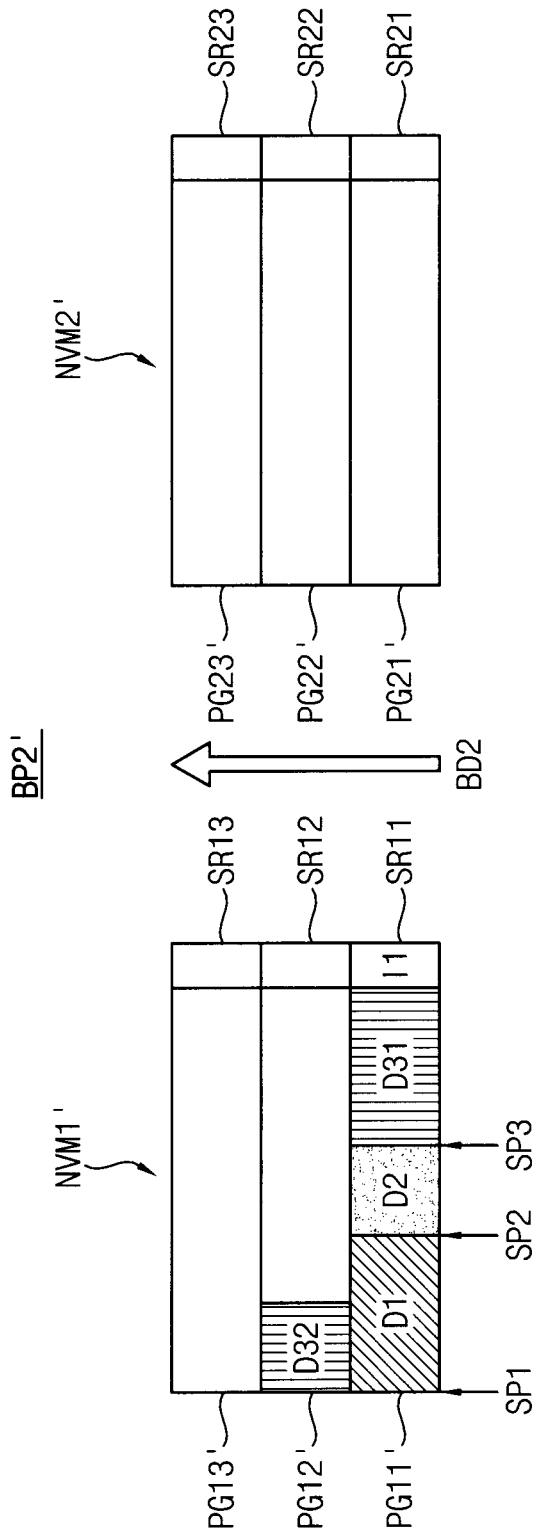

FIG. 19 is a flowchart illustrating a method of operating a storage device according to example embodiments. FIGS. 20A and 20B are diagrams for describing a method of operating a storage device according to example embodiments. The descriptions repeated with FIGS. 1, 5B, 5C and 14 will be omitted.

Referring to FIGS. 19, 20A and 20B, in a method of operating a storage device according to example embodiments, operation S1100a in FIG. 19 may be similar to operation S1100 in FIG. 14. In operation S1100a, an operation in which first information associated with the buffering policy for the first data is stored together in a spare region of the pages in which the first data is stored may be added.

For example, as illustrated in FIGS. 20A and 20B, pages PG11', PG12', PG13', PG21', PG22' and PG23' included in nonvolatile memory chips NVM1' and NVM2' may include spare regions SR11, SR12, SR13, SR21, SR22 and SR23, respectively. For example, the spare regions SR11, SR12, SR13, SR21, SR22 and SR23 may be regions for storing ECC information, etc. In the example of FIGS. 20A and 20B, the spare regions SR11, SR12, SR13, SR21, SR22 and SR23 may be used for additionally storing the first information.

In some example embodiments, the first information may include an address of a page to be read next. For example, in a case of a first buffering policy BP1' illustrated in FIG. 20A, data D3 may be stored in the pages PG11' and PG21', and thus information I1 stored in the spare region SR11 of the page PG11' may include an address of the page PG21' to be read after the page PG11' when reading the data D3. Similarly, in a case of a second buffering policy BP2' illustrated in FIG. 20B, data D3 may be stored in the pages PG11' and PG12', and thus information I2 stored in the spare region SR11 of the page PG11' may include an address of the page PG12' to be read after the page PG11' when reading the data D3.

A garbage collection operation is performed internally and by itself based on the first information without a command received from the external host device (operation S1300). As data are continuously written to a storage device, the data may become scattered over the entire storage device. To obtain a free memory block, or a storage space to which data can be written, it is possible to perform a garbage collection operation from time to time that moves an effective page of one memory block to another memory block and erases the one memory block. In other words, the garbage collection operation may represent an operation for obtaining or preparing a free memory block in the storage device.

When using the variable size mapping, it is required to read and parse the entire page in order to perform the garbage collection operation. At this time, since commands and logical addresses are not provided from the external host device, the mapping table (e.g., the mapping table in FIG. 5D) stored in the storage device and information included therein may not be used. In the example of FIGS. 20A and 20B, the first information may be stored together when the first data is programmed, and the first information may be used during the garbage collection operation, thereby efficiently performing the garbage collection operation. In some embodiments, the garbage collection is performed without a command from the external device.

As will be appreciated by those skilled in the art, the inventive concept may be embodied as a system, method, computer program product, and/or a computer program product embodied in one or more non-transitory computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 21:
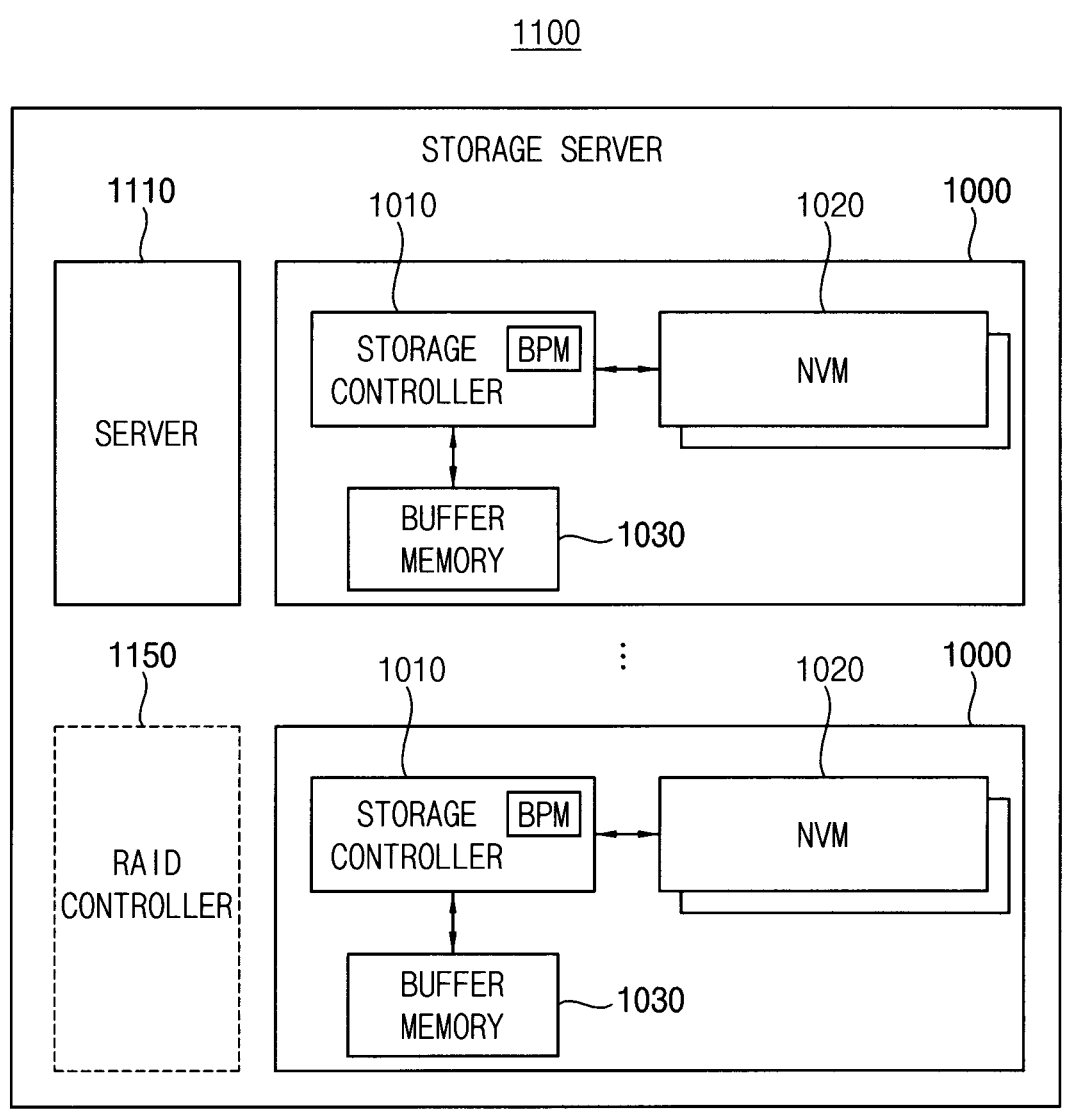
FIG. 21 is a block diagram illustrating a storage server including a storage device according to example embodiments.

FIG. 21 is a block diagram illustrating a storage server including a storage device according to example embodiments.

Referring to FIG. 21, a storage server 1100 may include a server 1110, a plurality of storage devices 1000 which store data for operating the server 1110, and a redundant array of independent drives (RAID) controller 1150 for controlling the plurality of storage devices 1000.

The RAID techniques are mainly used in data servers where important data can be replicated in more than one location across a plurality a plurality of storage devices. The RAID controller 1150 may enable one of a plurality of RAID levels according to RAID information, and may interfacing data between the server 1110 and the plurality of storage devices 1000.

Each of the plurality of storage devices 1000 may include a storage controller 1010 including a buffering policy manager BPM, a plurality of nonvolatile memories 1020 and a buffer memory 1030. Each of the plurality of storage devices 1000 may correspond to the storage device 300 according to example embodiments, and may operate according to example embodiments described above with reference to FIGS. 1 through 20. The server 1110 may correspond to the host device 200, and may control the plurality of storage devices 1000.

The inventive concept may be applied to various electronic devices and/or systems including the storage devices and the storage systems. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

In the method of managing data in the storage device, the method of operating the storage, and the storage device according to example embodiments, the buffering policy for data stored across multiple pages (e.g., the policy for each page) may be adaptively and/or intelligently set during runtime and may be changed according to the operating environment of the storage device. Accordingly, the balance between performance and available resources of the storage device may be controlled or adjusted, and the performance and efficiency of the storage device may be improved or enhanced.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating in a storage device including a plurality of nonvolatile memory chips, the method comprising:
    receiving a first data object from an external host device;
    based on determining that it is possible to store the first data object in a single page, controlling one nonvolatile memory chip among the plurality of nonvolatile memory chips such that the first data object is stored in the single page included in the one nonvolatile memory chip; and receiving a second data object from the external host device;

based on determining that it is impossible to store the second data object in the single page, controlling one or more nonvolatile memory chips among the plurality of nonvolatile memory chips to store the second data object in the one or more nonvolatile memory chips, wherein the controlling the one or more nonvolatile memory chips comprises:

based on a policy setting signal provided from the external host device, switching between (i) storing the second data object to first pages of two or more different nonvolatile memory chips, and (ii) storing the second data object to second pages of a single nonvolatile memory chip.

2. The method of claim 1, wherein the controlling the one or more nonvolatile memory chips further comprises:

based on a usage of an internal resource associated with a data write operation being less than a reference usage, storing the second data object across the first pages of the two or more different nonvolatile memory chips; and based on the usage of the internal resource being greater than or equal to the reference usage, storing the second data object across the second pages of the single nonvolatile memory chip.

3. The method of claim 2, wherein the storage device further includes a buffer memory configured to temporarily store a first data portion stored in the plurality of nonvolatile memory chips or store a second data portion to be stored into the plurality of nonvolatile memory chips, and the usage of the internal resource represents a current usage of the buffer memory.

4. The method of claim 1, wherein the controlling the one or more nonvolatile memory chips further includes:

based on a reading performance associated with a data read operation being higher than a reference performance, storing the second data object across the first pages of the two or more different nonvolatile memory chips; and based on the reading performance being lower than or equal to the reference performance, storing the second data object across the second pages of the single nonvolatile memory chip.

5. The method of claim 1, wherein the controlling the one or more nonvolatile memory chips further comprises:

based on an average size of recently stored data objects, among a plurality of data objects stored in the storage device at a first time associated with storing the first data object, being greater than a reference size, storing the second data object across the first pages of the two or more different nonvolatile memory chips; and based on the average size of the recently stored data objects being less than or equal to the reference size, storing the second data object across the second pages of the single nonvolatile memory chip.

6. The method of claim 5, wherein the recently stored data objects have been stored in the storage device within a predetermined time interval before the first time.

7. The method of claim 5, wherein the recently stored data objects have been stored in the storage device within a predetermined number of times before the first time.

8. The method of claim 1, further comprising:

mapping a first logical address of the first data object and a first physical address of pages in which the first data object is stored.

9. The method of claim 8, wherein the first physical address of pages includes:

a position of a foremost page among the first pages or the second pages, and a starting position of the first data object in the foremost page.

10. The method of claim 8, wherein a policy for storing the first data object is stored together with a mapping result.

11. The method of claim 1, further comprising:

based on determining that it is possible to store the first data object in the single page, mapping a first logical address of the first data object and a first physical address of the single page without storing a policy for storing the first data object.

12. The method of claim 1, wherein the plurality of nonvolatile memory chips are divided into first nonvolatile memory chips of a first group and second nonvolatile memory chips of a second group, and a first policy for storing the first data object in the first nonvolatile memory chips of the first group is different from a second policy for storing the first data object in the second nonvolatile memory chips of the second group.

13. The method of claim 1, wherein first information associated with a policy for storing the second data object is stored in a spare region of the first pages or of the second pages, and the method further comprises:

performing a garbage collection operation internally based on the first information without an external command received from the external host device.

* * * * *